(12) United States Patent
Christmas

(10) Patent No.: US 11,809,135 B2
(45) Date of Patent: *Nov. 7, 2023

(54) METHOD OF DISPLAYING A HOLOGRAM ON A DISPLAY DEVICE COMPRISING PIXELS

(71) Applicant: DUALITAS LTD, Milton Keynes (GB)

(72) Inventor: Jamieson Christmas, Milton Keynes (GB)

(73) Assignee: Dualitas Ltd, Milton Keynes (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/693,993

(22) Filed: Mar. 14, 2022

(65) Prior Publication Data

US 2022/0197215 A1     Jun. 23, 2022

Related U.S. Application Data

(63) Continuation of application No. 17/103,644, filed on Nov. 24, 2020, now Pat. No. 11,275,340, which is a
(Continued)

(30) Foreign Application Priority Data

May 25, 2018 (GB) ...................... 1808644

(51) Int. Cl.
*G03H 1/22* (2006.01)
*G09G 3/00* (2006.01)
*H04N 9/31* (2006.01)

(52) U.S. Cl.
CPC ......... *G03H 1/2294* (2013.01); *G03H 1/2286* (2013.01); *G09G 3/003* (2013.01);
(Continued)

(58) Field of Classification Search
CPC .. H04N 7/181; H04N 1/2129; H04N 5/23229; H04N 2201/0084; G06T 7/70;
(Continued)

(56) References Cited

U.S. PATENT DOCUMENTS

| 5,312,513 A | 5/1994 | Florence et al. |
| 10,514,658 B2 | 12/2019 | Christmas |

(Continued)

FOREIGN PATENT DOCUMENTS

| EP | 1457974 A1 | 9/2004 |
| EP | 2587320 A1 | 5/2013 |

(Continued)

OTHER PUBLICATIONS

S.C. Kim et al., "Effective reduction of the novel look-up table memory size based on a relationship between the pixel bitch and reconstruction distance of a computer-generated hologram," Appl. Opt, 50(19), p. 3375-3382 (2011).

(Continued)

*Primary Examiner* — Richard T Torrente
(74) *Attorney, Agent, or Firm* — McDonnell Boehnen Hulbert & Berghoff LLP

(57) ABSTRACT

There is provided a holographic projector comprising a hologram engine and a controller. The hologram engine is arranged to provide a hologram comprising a plurality of hologram pixels. Each hologram pixel has a respective hologram pixel value. The controller is arranged to selectively-drive a plurality of light-modulating pixels so as to display the hologram. Displaying the hologram comprises displaying each hologram pixel value on a contiguous group of light-modulating pixels of the plurality of light-modulating pixels such that there is a one-to-many pixel correlation between the hologram and the plurality of light-modulating pixels.

19 Claims, 12 Drawing Sheets

Related U.S. Application Data continuation of application No. 16/375,608, filed on Apr. 4, 2019, now Pat. No. 10,871,746.

(52) U.S. Cl.
CPC ....... *H04N 9/3105* (2013.01); *G03H 2222/12* (2013.01); *G03H 2222/13* (2013.01); *G03H 2222/34* (2013.01); *G03H 2225/60* (2013.01); *G09G 2320/064* (2013.01)

(58) Field of Classification Search
CPC ................... G06T 7/174; G06T 1/0007; G06T 2207/30244; G06T 2207/30252; G06T 3/4038; B60R 1/00; B60R 11/04; B60R 2300/30; B60R 2300/105; B60R 2300/303
See application file for complete search history.

(56) References Cited

U.S. PATENT DOCUMENTS

| | | | |
|---|---|---|---|
| 2011/0222179 A1* | 9/2011 | Monadgemi | G02B 6/3512 427/164 |
| 2011/0261427 A1 | 10/2011 | Hart et al. | |
| 2017/0038727 A1 | 2/2017 | Kim et al. | |
| 2018/0120768 A1 | 5/2018 | Christmas | |
| 2018/0364643 A1 | 12/2018 | Kroll et al. | |
| 2019/0354069 A1 | 11/2019 | Christmas | |
| 2021/0063964 A1* | 3/2021 | Marshel | G03H 1/0005 |
| 2021/0223738 A1* | 7/2021 | Futterer | G03H 1/268 |

FOREIGN PATENT DOCUMENTS

| | | | |
|---|---|---|---|
| GB | 2438681 A | 12/2007 | |
| GB | 2461294 A | 12/2009 | |
| GB | 2496108 A | 5/2013 | |
| GB | 2498170 A | 7/2013 | |
| GB | 2501112 A | 10/2013 | |
| GB | 2518664 A | 4/2015 | |
| GB | 2547929 A | 9/2017 | |
| JP | 2010139673 A | 6/2010 | |
| KR | 102016008344 A1 | 7/2016 | |

OTHER PUBLICATIONS

Combined Search and Examination Report dated Nov. 26, 2018 for UK Patent Application GB1808644.7, 3 pages.
Li et al., "Color holographic magnification system based on spatial light modulators," Journal of the SID 24/2, 2016, b. 125-129.
Copending U.S. Appl. No. 16/112, 153, filed Aug. 24, 2018.
Z. Zhang et al., "Fundamentals of phase only liquid crystal on silicon (LCOS) devices," Light: Science & Applications (2014) 3, e213.

* cited by examiner

METHOD OF DISPLAYING A HOLOGRAM ON A DISPLAY DEVICE COMPRISING PIXELS

CROSS-REFERENCE TO RELATED APPLICATIONS

This application is a continuation of U.S. patent application Ser. No. 17/103,644, filed Nov. 24, 2020, and U.S. patent application Ser. No. 16/375,608, filed Apr. 4, 2019, which claim the benefit of priority of United Kingdom Patent Application no. 1808644.7, filed May 25, 2018, each of which is hereby incorporated herein by reference in its entirety.

FIELD

The present disclosure relates to a method of operating, driving or controlling a spatial light modulator and a method of displaying a hologram. More specifically, the present disclosure relates to a method of allocating light-modulating pixels to hologram pixels and a method of displaying a hologram on a plurality of light-modulating pixels such as the pixels of a spatial light modulator. The present disclosure also relates to a method of changing the size of a holographic reconstruction and changing the resolution of a holographic reconstruction. The present disclosure further relates to a method of matching the size of a first colour holographic reconstruction to the size of a second colour holographic reconstruction.

BACKGROUND AND INTRODUCTION

Light scattered from an object contains both amplitude and phase information. This amplitude and phase information can be captured on, for example, a photosensitive plate by well-known interference techniques to form a holographic recording, or "hologram", comprising interference fringes. The hologram may be reconstructed by illumination with suitable light to form a two-dimensional or three-dimensional holographic reconstruction, or replay image, representative of the original object.

Computer-generated holography may numerically simulate the interference process. A computer-generated hologram may be calculated by a technique based on a mathematical transformation such as a Fresnel or Fourier transform. These types of holograms may be referred to as Fresnel/Fourier transform holograms or simply Fresnel/Fourier holograms. A Fourier hologram may be considered a Fourier domain/plane representation of the object or a frequency domain/plane representation of the object. A computer-generated hologram may also be calculated by coherent ray tracing or a point cloud technique, for example.

A computer-generated hologram may be encoded on a spatial light modulator arranged to modulate the amplitude and/or phase of incident light. Light modulation may be achieved using electrically-addressable liquid crystals, optically-addressable liquid crystals or micro-mirrors, for example.

A spatial light modulator typically comprises a plurality of individually-addressable pixels which may also be referred to as cells or elements. The light modulation scheme may be binary, multilevel or continuous. Alternatively, the device may be continuous (i.e. is not comprised of pixels) and light modulation may therefore be continuous across the device. The spatial light modulator may be reflective meaning that modulated light is output in reflection. The spatial light modulator may equally be transmissive meaning that modulated light is output in transmission.

Two approaches to providing colour holographic reconstruction are known: spatially-separated colours, "SSC", and frame sequential colour, "FSC". Both approaches are compatible with the present disclosure.

The method of SSC uses three spatially-separated arrays of light-modulating pixels for the three single-colour holograms. An advantage of the SSC method is that the image can be very bright because all three holographic reconstructions may be formed at the same time. However, if due to space limitations, the three spatially-separated arrays of light-modulating pixels are provided on a common SLM, the quality of each single-colour image is sub-optimal because only a subset of the available light-modulating pixels is used for each colour. Accordingly, a relatively low-resolution colour image is provided.

The method of FSC can use all pixels of a common spatial light modulator to display the three single-colour holograms in sequence. The single-colour reconstructions are cycled (e.g. red, green, blue, red, green, blue, etc.) fast enough such that a human viewer perceives a polychromatic image from integration of the three single-colour images. An advantage of FSC is that the whole SLM is used for each colour. This means that the quality of the three colour images produced is optimal because all pixels of the SLM are used for each of the colour images. However, a disadvantage of the FSC method is that the brightness of the composite colour image is lower than with the SSC method—by a factor of about 3—because each single-colour illumination event can only occur for one third of the frame time. This drawback could potentially be addressed by overdriving the lasers, or by using more powerful lasers, but this requires more power resulting in higher costs and an increase in the size of the system.

One issue with a colour holographic projector is that diffraction is fundamental to the holographic process and diffraction is dependent on wavelength. Specifically, the size of the holographic reconstruction is dependent on wavelength. In a composite colour scheme, this results in a reduction of the quality of the perceived composite colour reconstruction because there are two mismatches: (1) a mismatch in the overall size of the single-colour holographic reconstructions and (2) a mismatch between the positions of the image spots in the holographic reconstructions. The inventor previously disclosed a technique for addressing these mismatches comprising using different length Fourier paths for each colour channel—see, for example, British patent GB 2,547,929.

There is disclosed herein an improved holographic projector arranged to change the size of a holographic replay field which may implemented in a composite colour system to at least partially compensate for the mismatches resulting from the wavelength-dependence of diffraction.

SUMMARY

Aspects of the present disclosure are defined in the appended independent claims.

There is provided a method of displaying holograms. The method comprises receiving a hologram and displaying the hologram on a plurality of light-modulating pixels. The hologram comprises a plurality of hologram pixels each having a respective hologram pixel value. Displaying the hologram comprises displaying each hologram pixel value on a contiguous group of light-modulating pixels of the plurality of light-modulating pixels such that there is a one-to-many pixel correlation between the hologram and the plurality of light-modulating pixels.

Likewise, there is provided a holographic projector comprising a hologram engine and a controller. The hologram engine is arranged to provide a hologram comprising a plurality of hologram pixels. Each hologram pixel has a respective hologram pixel value. The controller is arranged to selectively-drive a plurality of light-modulating pixels so as to display the hologram. Displaying the hologram comprises displaying each hologram pixel value on a contiguous group of light-modulating pixels of the plurality of light-modulating pixels such that there is a one-to-many pixel correlation between the hologram and the plurality of light-modulating pixels.

Each contiguous group of light-modulating pixels comprises a plurality of individual light-modulating pixels which effectively function as a larger light-modulating pixel. In other words, the size of each light-modulating area is increased by using more than one light-modulating pixel in a contiguous group to display each hologram pixel. The position of each hologram pixel relative to each of the other hologram pixels is preserved using a one-to-many pixel mapping scheme. Accordingly, the holographic reconstruction may be fully formed using larger pixels. The size of the effective pixels determines the diffraction angle which therefore determines the size of the holographic replay field. There is therefore provided a system in which the size of the holographic replay field is changed using a reconfigurable pixel mapping scheme controllable by software. The method disclosed herein is particularly effective as the pixel size of available spatial light modulators continues to decrease. Each light-modulating pixel of the plurality of light-modulating pixels may have a pixel size (e.g. width) less than 2000 nm, optionally, less than 1000 nm such as less than 500 nm or less than 250 nm.

The method may further comprise using a first number of light-modulating pixels to display each hologram pixel value of a first hologram. The method may further comprise using a second number of light-modulating pixels to display each hologram pixel value of a second hologram.

Likewise, the controller may be further arranged to selectively-drive the plurality of light-modulating pixels such that a first number of light-modulating pixels are used to display each hologram pixel value of a first hologram. The controller may also be further arranged to selectively-drive the plurality of light-modulating pixels such that a second number of light-modulating pixels are used to display each hologram pixel value of a second hologram.

The size of the holographic replay field may be dynamically-changed in software by changing the number of pixels in each contiguous group. It is therefore possible to change the size of the holographic replay field on-the-fly. In particular, no hardware change is required to change the size of the holographic replay field during a display event comprising at least two frames. For example, the one-to-many pixel mapping scheme described may be changed between a first and second frame or first and second sub-frame in a FSC scheme.

The method may further comprise receiving a second hologram and displaying the second hologram. The second hologram comprises a plurality of hologram pixels each having a respective hologram pixel value. The second hologram is displayed on a plurality of light-modulating pixels by displaying each hologram pixel value on a corresponding light-modulating pixel such that there is a one-to-one correlation between the second hologram and the plurality of light-modulating pixels.

Likewise, the controller may be further arranged to provide a second hologram and selectively-drive the plurality of light-modulating pixels so as to display the second hologram. The second hologram comprises a plurality of hologram pixels each having a respective hologram pixel value. The second hologram is displayed on a plurality of light-modulating pixels by displaying each hologram pixel value on a corresponding light-modulating pixel such that there is a one-to-one correlation between the second hologram and the plurality of light-modulating pixels.

It is not essential that each holographic reconstruction is formed using a one-to-many pixel mapping scheme. The method may include displaying at least one hologram using a one-to-many pixel mapping scheme and at least one hologram using a conventional one-to-one pixel mapping scheme.

The first hologram and second hologram may be displayed on the same spatial light modulator.

Advantageously, there is described an improved method of driving a spatial light modulator which can be implemented on any spatial light modulator. It is therefore possible to form a plurality of different size holographic replay fields using the same spatial light modulator. That is, a different spatial light modulator is not required for each different size holographic replay field.

The method may further comprises using at least one light-modulating pixel to display a hologram pixel value of the first hologram at a first time and a hologram pixel value of the second hologram at a second time, wherein the second time is different to the first time.

The method disclosed herein is particularly suitable for displaying changing images where there might be a need to change the image size during a display event. For example, the method disclosed herein is particularly suitable for FSC where it may be desirable to reduce any mismatches between two different colour images.

The first hologram may be displayed on a first spatial light modulator and the second hologram may be displayed on a second spatial light modulator.

The method disclosed herein is fully flexible and may therefore equally be implemented in a holographic projector comprising a plurality of spatial light modulators in which at least a first hologram is displayed on a first spatial light modulator having a first effective pixel size and at least a second hologram is displayed on a second spatial light modulator having a second effective pixel size, wherein the second effective pixel size is different to the first effective pixel size. Such a method using a plurality of spatial light modulators may be advantageous in projection arrangements in which different optical channels are provided for different holographic reconstructions.

The method may further comprises illuminating the displayed hologram with light having a wavelength to project a holographic replay field having an (first) area and illuminating the second displayed hologram with light having a second wavelength to project a second holographic replay field having a second area.

Likewise, the holographic projector may further comprise a (first) lighting system (or light engine) and a second lighting system (or second light engine). The (first) lighting system may be arranged to illuminate the (first) displayed hologram with (first) light having a (first) wavelength so as to project a (first) holographic replay field having a (first) area. The second lighting system may be arranged to illuminate the second displayed hologram with second light having a second wavelength so as to project a second holographic replay field having a second area.

The first light may be collimated and may have a first beam diameter. The second light may be collimated and may have a second beam diameter. The first beam diameter may be different to the second beam diameter. If the first wavelength is greater than the second wavelength, the first beam diameter may be greater than the second beam diameter such that the second lighting system is smaller (i.e. occupies less volume) than the first light system. If the number of device pixels used to display each hologram pixel of a first hologram is greater than the number of device pixels used to display each hologram pixel of a second hologram, the first beam diameter used to illuminate the first hologram may be greater than the second beam diameter used to illuminate the second hologram such that the second lighting system is smaller (i.e. occupies less volume) than the first light system.

More generally, the method may further comprise selecting the beam diameter of the collimated light used to illuminate the hologram based on the wavelength of the collimated light or the number of device pixels used to display each hologram pixel.

The method disclosed herein may be used to reduce any mismatches between two different colour images formed from two respective holograms.

The different number of light-modulating pixels used to display the hologram and the second hologram may be such that the area and second area are substantially the same size.

The method may be used to compensate for any differences in overall image size resulting from reconstructing holograms using different wavelengths of light.

The method may further comprise overlapping the area and second area to form a composite colour replay field.

The method is particularly effective at producing improved composite colour images in which any mismatches between the single-colour images are reduced.

There is also provided a method of operating a spatial light modulator comprising a plurality of light-modulating elements, the method comprising: receiving a hologram comprising a plurality of hologram pixels, wherein the plurality of hologram pixels is less than the plurality of light-modulating elements; and allocating a plurality of light-modulating elements to each hologram pixel.

There is also provided a method of operating a spatial light modulator comprising a plurality of device pixels, the method comprising: receiving a hologram comprising a plurality of hologram pixels, wherein the plurality of hologram pixels is less than the plurality of device pixels; displaying the hologram on the spatial light modulator; and illuminating the spatial light modulator with light to project a holographic reconstruction, wherein the method is characterised by further comprising determining the number of device pixels used to display each hologram pixel based on the wavelength of the light or a desired image size.

The term "hologram" is used to refer to the recording which contains amplitude information or phase information, or some combination thereof, regarding the object. The term "holographic reconstruction" is used to refer to the optical reconstruction of the object which is formed by illuminating the hologram. The system disclosed herein is described as a "holographic projector" because the holographic reconstruction is a real image and spatially-separated from the hologram. The term "replay field" is used to refer to the 2D area within which the holographic reconstruction is formed and fully focused. If the hologram is displayed on a spatial light modulator comprising pixels, the replay field will be repeated in the form of a plurality diffracted orders wherein each diffracted order is a replica of the zeroth-order replay field. The zeroth-order replay field generally corresponds to the preferred or primary replay field because it is the brightest replay field. Unless explicitly stated otherwise, the term "replay field" should be taken as referring to the zeroth-order replay field. The term "replay plane" is used to refer to the plane in space containing all the replay fields. The terms "image", "replay image" and "image region" refer to areas of the replay field illuminated by light of the holographic reconstruction. In some embodiments, the "image" may comprise discrete spots which may be referred to as "image spots" or, for convenience only, "image pixels".

The terms "encoding", "writing" or "addressing" are used to describe the process of providing the plurality of pixels of the SLM with a respective plurality of control values which respectively determine the modulation level of each pixel. It may be said that the pixels of the SLM are configured to "display" a light modulation distribution in response to receiving the plurality of control values. Thus, the SLM may be said to "display" a hologram and the hologram may be considered an array of light modulation values or levels.

It has been found that a holographic reconstruction of acceptable quality can be formed from a "hologram" containing only phase information related to the Fourier transform of the original object. Such a holographic recording may be referred to as a phase-only hologram. Embodiments relate to a phase-only hologram but the present disclosure is equally applicable to amplitude-only holography.

The present disclosure is also equally applicable to forming a holographic reconstruction using amplitude and phase information related to the Fourier transform of the original object. In some embodiments, this is achieved by complex modulation using a so-called fully complex hologram which contains both amplitude and phase information related to the original object. Such a hologram may be referred to as a fully-complex hologram because the value (grey level) assigned to each pixel of the hologram has an amplitude and phase component. The value (grey level) assigned to each pixel may be represented as a complex number having both amplitude and phase components. In some embodiments, a fully-complex computer-generated hologram is calculated.

Reference may be made to the phase value, phase component, phase information or, simply, phase of pixels of the computer-generated hologram or the spatial light modulator as shorthand for "phase-delay". That is, any phase value described is, in fact, a number (e.g. in the range 0 to $2\pi$) which represents the amount of phase retardation provided by that pixel. For example, a pixel of the spatial light modulator described as having a phase value of $\pi/2$ will retard the phase of received light by $\pi/2$ radians. In some embodiments, each pixel of the spatial light modulator is operable in one of a plurality of possible modulation values (e.g. phase delay values). The term "grey level" may be used to refer to the plurality of available modulation levels. For example, the term "grey level" may be used for convenience to refer to the plurality of available phase levels in a phase-only modulator even though different phase levels do not provide different shades of grey. The term "grey level" may also be used for convenience to refer to the plurality of available complex modulation levels in a complex modulator.

The hologram therefore comprises an array of grey levels—that is, an array of light modulation values such as an array of phase-delay values or complex modulation values. The hologram is also considered a diffractive pattern because it is a pattern that causes diffraction when displayed on a spatial light modulator and illuminated with light having a wavelength comparable to, generally less than, the pixel pitch of the spatial light modulator. Reference is made herein to combining the hologram with other diffractive patterns such as diffractive patterns functioning as a lens or grating. For example, a diffractive pattern functioning as a grating may be combined with a hologram to translate the replay field on the replay plane or a diffractive pattern functioning as a lens may be combined with a hologram to focus the holographic reconstruction on a replay plane in the near field.

Although different embodiments and groups of embodiments may be disclosed separately in the detailed description which follows, any feature of any embodiment or group of embodiments may be combined with any other feature or combination of features of any embodiment or group of embodiments. That is, all possible combinations and permutations of features disclosed in the present disclosure are envisaged.

BRIEF DESCRIPTION OF THE DRAWINGS

Specific embodiments are described by way of example only with reference to the following figures:

FIG. 5 shows a first hologram mapping scheme in accordance with some embodiments;

FIG. 6 shows a second hologram mapping scheme in accordance with some embodiments;

FIG. 7 shows a third hologram mapping scheme in accordance with some embodiments;

FIG. 8 shows a fourth hologram mapping scheme in accordance with some embodiments;

The same reference numbers will be used throughout the drawings to refer to the same or like parts.

DETAILED DESCRIPTION OF EMBODIMENTS

The present invention is not restricted to the embodiments described in the following but extends to the full scope of the appended claims. That is, the present invention may be embodied in different forms and should not be construed as limited to the described embodiments, which are set out for the purpose of illustration.

A structure described as being formed at an upper portion/lower portion of another structure or on/under the other structure should be construed as including a case where the structures contact each other and, moreover, a case where a third structure is disposed there between.

In describing a time relationship—for example, when the temporal order of events is described as "after", "subsequent", "next", "before" or suchlike—the present disclosure should be taken to include continuous and non-continuous events unless otherwise specified. For example, the description should be taken to include a case which is not continuous unless wording such as "just", "immediate" or "direct" is used.

Although the terms "first", "second", etc. may be used herein to describe various elements, these elements are not to be limited by these terms. These terms are only used to distinguish one element from another. For example, a first element could be termed a second element, and, similarly, a second element could be termed a first element, without departing from the scope of the appended claims.

Features of different embodiments may be partially or overall coupled to or combined with each other, and may be variously inter-operated with each other. Some embodiments may be carried out independently from each other, or may be carried out together in co-dependent relationship.

Optical Configuration

Figure 1:
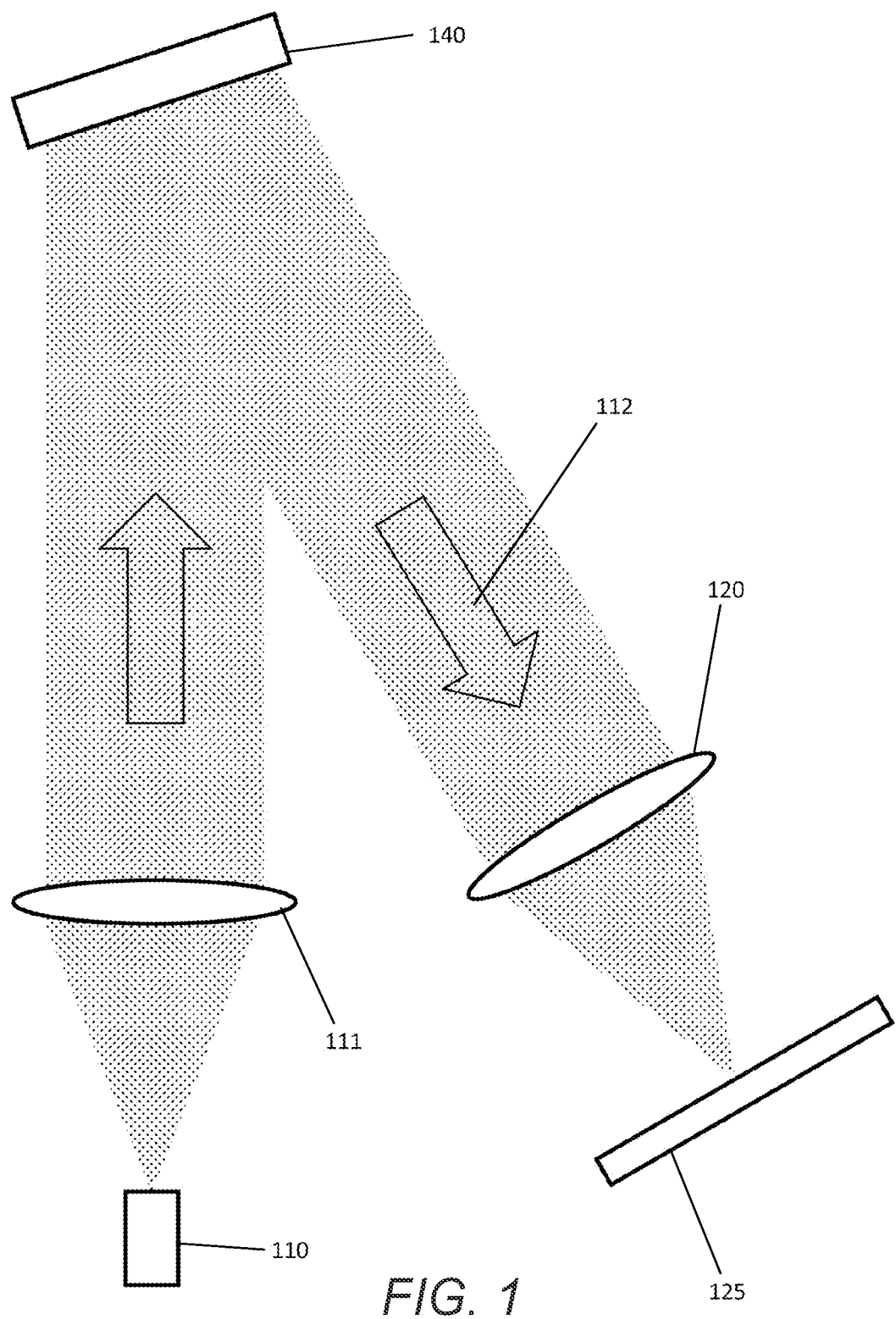
FIG. 1 is a schematic showing a reflective SLM producing a holographic reconstruction on a screen.

FIG. 1 shows an embodiment in which a computer-generated hologram is encoded on a single spatial light modulator. The computer-generated hologram is a Fourier transform of the object for reconstruction. It may therefore be said that the hologram is a Fourier domain or frequency domain or spectral domain representation of the object. In this embodiment, the spatial light modulator is a reflective liquid crystal on silicon, "LCOS", device. The hologram is encoded on the spatial light modulator and a holographic reconstruction is formed at a replay field, for example, a light receiving surface such as a screen or diffuser.

A light source 110, for example a laser or laser diode, is disposed to illuminate the SLM 140 via a collimating lens 111. The collimating lens causes a generally planar wavefront of light to be incident on the SLM. In FIG. 1, the direction of the wavefront is off-normal (e.g. two or three degrees away from being truly orthogonal to the plane of the transparent layer). However, in other embodiments, the generally planar wavefront is provided at normal incidence and a beam splitter arrangement is used to separate the input and output optical paths. In the embodiment shown in FIG. 1, the arrangement is such that light from the light source is reflected off a mirrored rear surface of the SLM and interacts with a light-modulating layer to form an exit wavefront 112. The exit wavefront 112 is applied to optics including a Fourier transform lens 120, having its focus at a screen 125. More specifically, the Fourier transform lens 120 receives a beam of modulated light from the SLM 140 and performs a frequency-space transformation to produce a holographic reconstruction at the screen 125.

Notably, in this type of holography, each pixel of the hologram contributes to the whole reconstruction. There is not a one-to-one correlation between specific points (or image pixels) on the replay field and specific light-modulating elements (or hologram pixels). In other words, modulated light exiting the light-modulating layer is distributed across the replay field.

In these embodiments, the position of the holographic reconstruction in space is determined by the dioptric (focusing) power of the Fourier transform lens. In the embodiment shown in FIG. 1, the Fourier transform lens is a physical lens. That is, the Fourier transform lens is an optical Fourier transform lens and the Fourier transform is performed optically. Any lens can act as a Fourier transform lens but the performance of the lens will limit the accuracy of the Fourier transform it performs. The skilled person understands how to use a lens to perform an optical Fourier transform.

Hologram Calculation

In some embodiments, the computer-generated hologram is a Fourier transform hologram, or simply a Fourier hologram or Fourier-based hologram, in which an image is reconstructed in the far field by utilising the Fourier transforming properties of a positive lens. The Fourier hologram is calculated by Fourier transforming the desired light field in the replay plane back to the lens plane. Computer-generated Fourier holograms may be calculated using Fourier transforms.

A Fourier transform hologram may be calculated using an algorithm such as the Gerchberg-Saxton algorithm. Furthermore, the Gerchberg-Saxton algorithm may be used to calculate a hologram in the Fourier domain (i.e. a Fourier transform hologram) from amplitude-only information in the spatial domain (such as a photograph). The phase information related to the object is effectively "retrieved" from the amplitude-only information in the spatial domain. In some embodiments, a computer-generated hologram is calculated from amplitude-only information using the Gerchberg-Saxton algorithm or a variation thereof.

The Gerchberg Saxton algorithm considers the situation when intensity cross-sections of a light beam, $I_A(x, y)$ and $I_B(x, y)$, in the planes A and B respectively, are known and $I_A(x, y)$ and $I_B(x, y)$ are related by a single Fourier transform. With the given intensity cross-sections, an approximation to the phase distribution in the planes A and B, $\psi_A(x, y)$ and $\psi_B(x, y)$ respectively, is found. The Gerchberg-Saxton algorithm finds solutions to this problem by following an iterative process. More specifically, the Gerchberg-Saxton algorithm iteratively applies spatial and spectral constraints while repeatedly transferring a data set (amplitude and phase), representative of $I_A(x, y)$ and $I_B(x, y)$, between the spatial domain and the Fourier (spectral or frequency) domain. The corresponding computer-generated hologram in the spectral domain is obtained through at least one iteration of the algorithm. The algorithm is convergent and arranged to produce a hologram representing an input image. The hologram may be an amplitude-only hologram, a phase-only hologram or a fully complex hologram.

In some embodiments, a phase-only hologram is calculated using an algorithm based on the Gerchberg-Saxton algorithm such as described in British patent 2,498,170 or 2,501,112 which are hereby incorporated in their entirety by reference. However, embodiments disclosed herein describe calculating a phase-only hologram by way of example only. In these embodiments, the Gerchberg-Saxton algorithm retrieves the phase information $\psi[u, v]$ of the Fourier transform of the data set which gives rise to a known amplitude information $T[x, y]$, wherein the amplitude information $T[x, y]$ is representative of a target image (e.g. a photograph). Since the magnitude and phase are intrinsically combined in the Fourier transform, the transformed magnitude and phase contain useful information about the accuracy of the calculated data set. Thus, the algorithm may be used iteratively with feedback on both the amplitude and the phase information. However, in these embodiments, only the phase information $\psi[u, v]$ is used as the hologram to form a holographic representation of the target image at an image plane. The hologram is a data set (e.g. 2D array) of phase values.

In other embodiments, an algorithm based on the Gerchberg-Saxton algorithm is used to calculate a fully-complex hologram. A fully-complex hologram is a hologram having a magnitude component and a phase component. The hologram is a data set (e.g. 2D array) comprising an array of complex data values wherein each complex data value comprises a magnitude component and a phase component.

In some embodiments, the algorithm processes complex data and the Fourier transforms are complex Fourier transforms. Complex data may be considered as comprising (i) a real component and an imaginary component or (ii) a magnitude component and a phase component. In some embodiments, the two components of the complex data are processed differently at various stages of the algorithm.

Figure 2A:
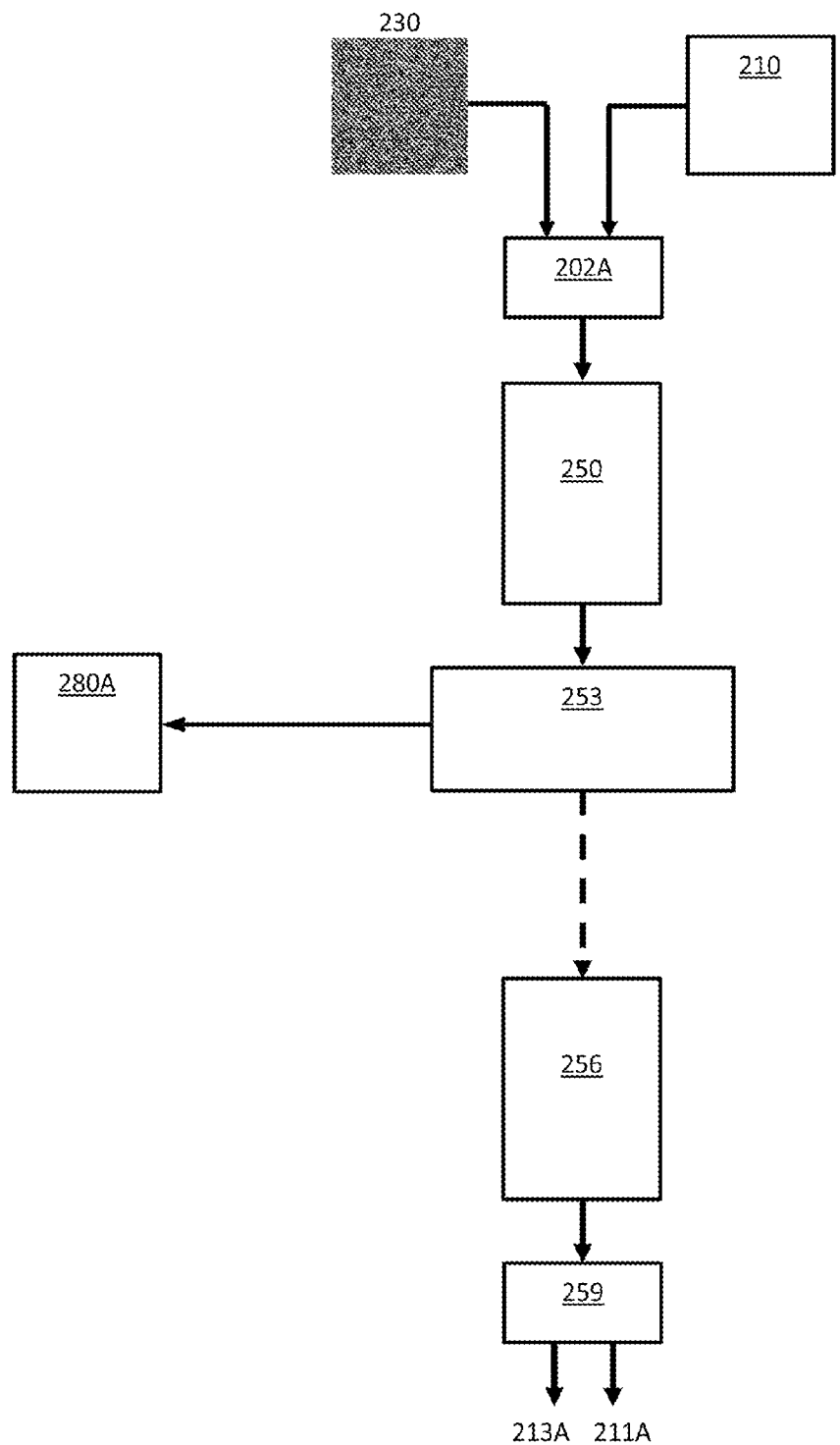
FIG. 2A illustrates a first iteration of an example Gerchberg-Saxton type algorithm.

FIG. 2A illustrates the first iteration of an algorithm in accordance with some embodiments for calculating a phase-only hologram. The input to the algorithm is an input image 210 comprising a 2D array of pixels or data values, wherein each pixel or data value is a magnitude, or amplitude, value. That is, each pixel or data value of the input image 210 does not have a phase component. The input image 210 may therefore be considered a magnitude-only or amplitude-only or intensity-only distribution. An example of such an input image 210 is a photograph or one frame of video comprising a temporal sequence of frames. The first iteration of the algorithm starts with a data forming step 202A comprising assigning a random phase value to each pixel of the input image, using a random phase distribution (or random phase seed) 230, to form a starting complex data set wherein each data element of the set comprising magnitude and phase. It may be said that the starting complex data set is representative of the input image in the spatial domain.

First processing block 250 receives the starting complex data set and performs a complex Fourier transform to form a Fourier transformed complex data set. Second processing block 253 receives the Fourier transformed complex data set and outputs a hologram 280A. In some embodiments, the hologram 280A is a phase-only hologram. In these embodiments, second processing block 253 quantiles each phase value and sets each amplitude value to unity in order to form hologram 280A. Each phase value is quantised in accordance with the phase-levels which may be represented on the pixels of the spatial light modulator which will be used to "display" the phase-only hologram. For example, if each pixel of the spatial light modulator provides 256 different phase levels, each phase value of the hologram is quantised into one phase level of the 256 possible phase levels. Hologram 280A is a phase-only Fourier hologram which is representative of an input image. In other embodiments, the hologram 280A is a fully complex hologram comprising an array of complex data values (each including an amplitude component and a phase component) derived from the received Fourier transformed complex data set. In some embodiments, second processing block 253 constrains each complex data value to one of a plurality of allowable complex modulation levels to form hologram 280A. The step of constraining may include setting each complex data value to the nearest allowable complex modulation level in the complex plane. It may be said that hologram 280A is representative of the input image in the spectral or Fourier or frequency domain. In some embodiments, the algorithm stops at this point.

However, in other embodiments, the algorithm continues as represented by the dotted arrow in FIG. 2A. In other words, the steps which follow the dotted arrow in FIG. 2A are optional (i.e. not essential to all embodiments).

Third processing block 256 receives the modified complex data set from the second processing block 253 and performs an inverse Fourier transform to form an inverse Fourier transformed complex data set. It may be said that the inverse Fourier transformed complex data set is representative of the input image in the spatial domain.

Fourth processing block 259 receives the inverse Fourier transformed complex data set and extracts the distribution of magnitude values 211A and the distribution of phase values 213A.

Optionally, the fourth processing block 259 assesses the distribution of magnitude values 211A. Specifically, the fourth processing block 259 may compare the distribution of magnitude values 211A of the inverse Fourier transformed complex data set with the input image 510 which is itself, of course, a distribution of magnitude values. If the difference between the distribution of magnitude values 211A and the input image 210 is sufficiently small, the fourth processing block 259 may determine that the hologram 280A is acceptable. That is, if the difference between the distribution of magnitude values 211A and the input image 210 is sufficiently small, the fourth processing block 259 may determine that the hologram 280A is a sufficiently-accurate representative of the input image 210. In some embodiments, the distribution of phase values 213A of the inverse Fourier transformed complex data set is ignored for the purpose of the comparison. It will be appreciated that any number of different methods for comparing the distribution of magnitude values 211A and the input image 210 may be employed and the present disclosure is not limited to any particular method. In some embodiments, a mean square difference is calculated and if the mean square difference is less than a threshold value, the hologram 280A is deemed acceptable. If the fourth processing block 259 determines that the hologram 280A is not acceptable, a further iteration of the algorithm may be performed. However, this comparison step is not essential and in other embodiments, the number of iterations of the algorithm performed is predetermined or preset or user-defined.

Figure 2B:
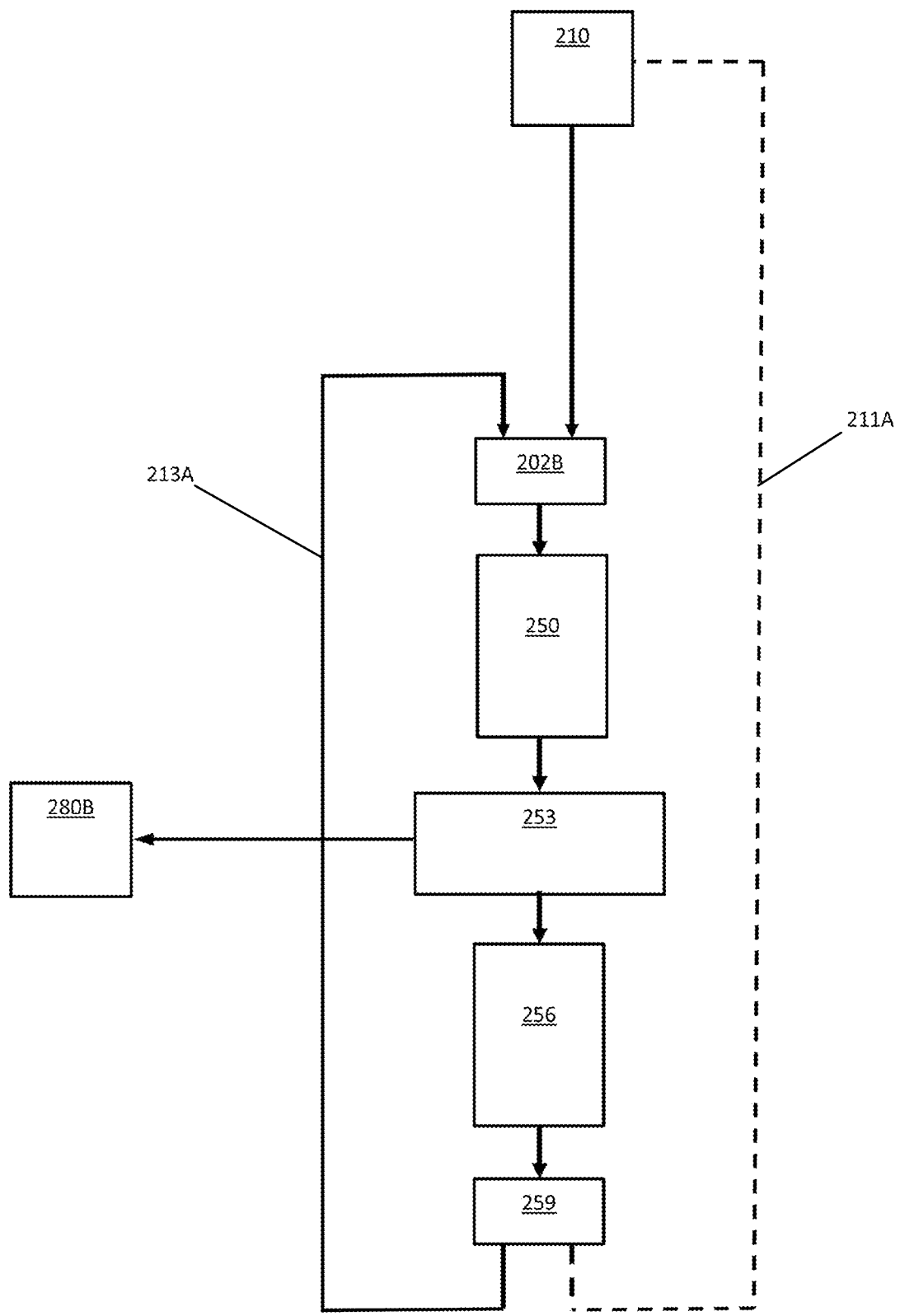
FIG. 2B illustrates the second and subsequent iterations of the example Gerchberg-Saxton type algorithm.

FIG. 2B represents a second iteration of the algorithm and any further iterations of the algorithm. The distribution of phase values 213A of the preceding iteration is fed-back through the processing blocks of the algorithm. The distribution of magnitude values 211A is rejected in favour of the distribution of magnitude values of the input image 210. In the first iteration, the data forming step 202A formed the first complex data set by combining distribution of magnitude values of the input image 210 with a random phase distribution 230. However, in the second and subsequent iterations, the data forming step 202B comprises forming a complex data set by combining (i) the distribution of phase values 213A from the previous iteration of the algorithm with (ii) the distribution of magnitude values of the input image 210.

The complex data set formed by the data forming step 202B of FIG. 2B is then processed in the same way described with reference to FIG. 2A to form second iteration hologram 280B. The explanation of the process is not therefore repeated here. The algorithm may stop when the second iteration hologram 280B has been calculated. However, any number of further iterations of the algorithm may be performed. It will be understood that the third processing block 256 is only required if the fourth processing block 259 is required or a further iteration is required. The output hologram 280B generally gets better with each iteration. However, in practice, a point is usually reached at which no measurable improvement is observed or the positive benefit of performing a further iteration is out-weighted by the negative effect of additional processing time. Hence, the algorithm is described as iterative and convergent.

Figure 2C:
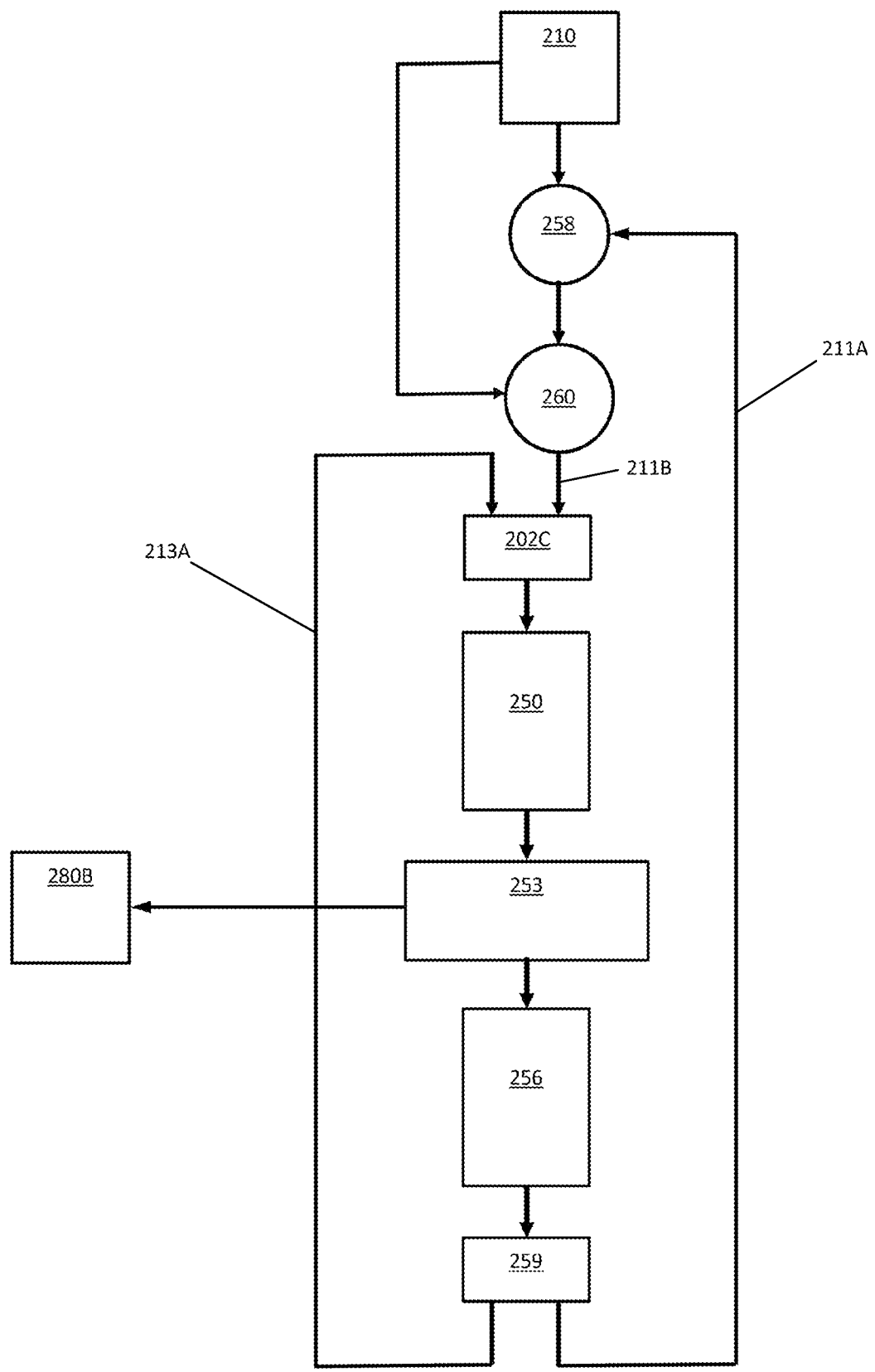
FIG. 2C illustrates alternative second and subsequent iterations of the example Gerchberg-Saxton type algorithm.

FIG. 2C represents an alternative embodiment of the second and subsequent iterations. The distribution of phase values 213A of the preceding iteration is fed-back through the processing blocks of the algorithm. The distribution of magnitude values 211A is rejected in favour of an alternative distribution of magnitude values. In this alternative embodiment, the alternative distribution of magnitude values is derived from the distribution of magnitude values 211 of the previous iteration. Specifically, processing block 258 subtracts the distribution of magnitude values of the input image 210 from the distribution of magnitude values 211 of the previous iteration, scales that difference by a gain factor α and subtracts the scaled difference from the input image 210. This is expressed mathematically by the following equations, wherein the subscript text and numbers indicate the iteration number:

$$R_{n+1}[x, y] = F'\{\exp(i\psi_n[u, v])\}$$
$$\psi_n[u, v] = \angle F\{\eta \cdot \exp(i\angle R_n[x, y])\}$$
$$\eta = T[x, y] - \alpha(|R_n[x, y]| - T[x, y])$$

where:
F' is the inverse Fourier transform;
F is the forward Fourier transform;
R[x, y] is the complex data set output by the third processing block 256;
T[x, y] is the input or target image;
∠ is the phase component;
ψ is the phase-only hologram 280B;
η is the new distribution of magnitude values 211B; and
α is the gain factor.

The gain factor α may be fixed or variable. In some embodiments, the gain factor α is determined based on the size and rate of the incoming target image data. In some embodiments, the gain factor α is dependent on the iteration number. In some embodiments, the gain factor is solely function of the iteration number.

The embodiment of FIG. 2C is the same as that of FIG. 2A and FIG. 2B in all other respects. It may be said that the phase-only hologram ψ(u, v) comprises a phase distribution in the frequency or Fourier domain.

In some embodiments, the Fourier transform is performed using the spatial light modulator. Specifically, the hologram data is combined with second data providing optical power. That is, the data written to the spatial light modulation comprises hologram data representing the object and lens data representative of a lens. When displayed on a spatial light modulator and illuminated with light, the lens data emulates a physical lens—that is, it brings light to a focus in the same way as the corresponding physical optic. The lens data therefore provides optical, or focusing, power. In these embodiments, the physical Fourier transform lens 120 of FIG. 1 may be omitted. It is known in the field of computer-generated holography how to calculate data representative of a lens. The data representative of a lens may be referred to as a software lens. For example, a phase-only lens may be formed by calculating the phase delay caused by each point of the lens owing to its refractive index and spatially-variant optical path length. For example, the optical path length at the centre of a convex lens is greater than the optical path length at the edges of the lens. An amplitude-only lens may be formed by a Fresnel zone plate. It is also known in the art of computer-generated holography how to combine data representative of a lens with a hologram so that a Fourier transform of the hologram can be performed without the need for a physical Fourier lens. In some embodiments, lensing data is combined with the hologram by simple addition such as simple vector addition. In some embodiments, a physical lens is used in conjunction with a software lens to perform the Fourier transform. Alternatively, in other embodiments, the Fourier transform lens is omitted altogether such that the holographic reconstruction takes place in the far-field. In further embodiments, the hologram may be combined in the same way with grating data—that is, data arranged to perform the function of a grating such as beam steering. Again, it is known in the field of computer-generated holography how to calculate such data. For example, a phase-only grating may be formed by modelling the phase delay caused by each point on the surface of a blazed grating. An amplitude-only grating may be simply superimposed with an amplitude-only hologram to provide angular steering of the holographic reconstruction.

In some embodiments, the Fourier transform is performed jointly by a physical Fourier transform lens and a software lens. That is, some optical power which contributes to the Fourier transform is provided by a software lens and the rest of the optical power which contributes to the Fourier transform is provided by a physical optic or optics.

In some embodiments, there is provided a real-time engine arranged to receive image data and calculate holograms in real-time using the algorithm. In some embodiments, the image data is a video comprising a sequence of image frames. In other embodiments, the holograms are pre-calculated, stored in computer memory and recalled as needed for display on a SLM. That is, in some embodiments, there is provided a repository of predetermined holograms.

Embodiments relate to Fourier holography and Gerchberg-Saxton type algorithms by way of example only. The present disclosure is equally applicable to Fresnel holography and holograms calculated by other techniques such as those based on point cloud methods.

Light Modulation

A spatial light modulator may be used to display the diffractive pattern including the computer-generated hologram. If the hologram is a phase-only hologram, a spatial light modulator which modulates phase is required. If the hologram is a fully-complex hologram, a spatial light modulator which modulates phase and amplitude may be used or a first spatial light modulator which modulates phase and a second spatial light modulator which modulates amplitude may be used.

In some embodiments, the light-modulating elements (i.e. the pixels) of the spatial light modulator are cells containing liquid crystal. That is, in some embodiments, the spatial light modulator is a liquid crystal device in which the optically-active component is the liquid crystal. Each liquid crystal cell is configured to selectively-provide a plurality of light modulation levels. That is, each liquid crystal cell is configured at any one time to operate at one light modulation level selected from a plurality of possible light modulation levels. Each liquid crystal cell is dynamically-reconfigurable to a different light modulation level from the plurality of light modulation levels. In some embodiments, the spatial light modulator is a reflective liquid crystal on silicon (LCOS) spatial light modulator but the present disclosure is not restricted to this type of spatial light modulator.

A LCOS device provides a dense array of light modulating elements, or pixels, within a small aperture (e.g. a few centimetres in width). The pixels are typically approximately 10 microns or less which results in a diffraction angle of a few degrees meaning that the optical system can be compact. It is easier to adequately illuminate the small aperture of a LCOS SLM than it is the larger aperture of other liquid crystal devices. An LCOS device is typically reflective which means that the circuitry which drives the pixels of a LCOS SLM can be buried under the reflective surface. The results in a higher aperture ratio. In other words, the pixels are closely packed meaning there is very little dead space between the pixels. This is advantageous because it reduces the optical noise in the replay field. A LCOS SLM uses a silicon backplane which has the advantage that the pixels are optically flat. This is particularly important for a phase modulating device.

Figure 3:
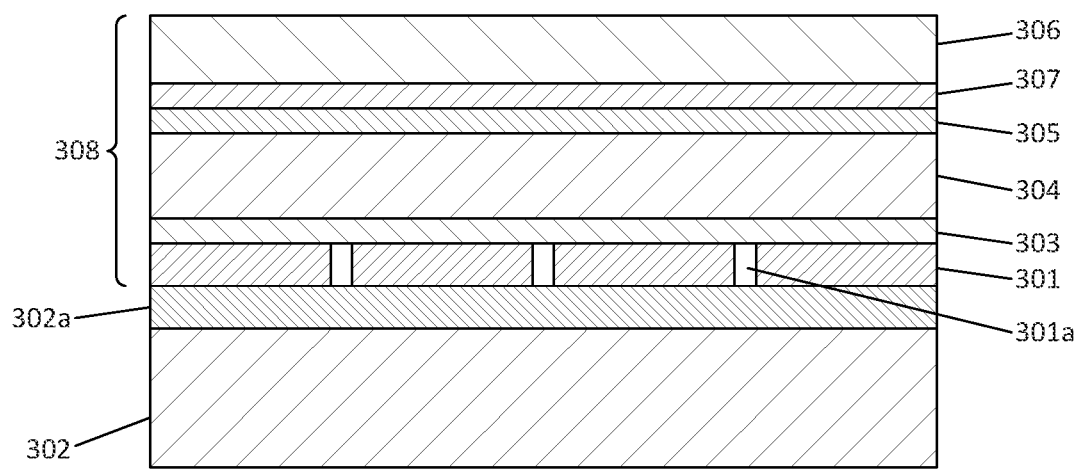
FIG. 3 is a schematic of a reflective LCOS SLM.

A suitable LCOS SLM is described below, by way of example only, with reference to FIG. 3. An LCOS device is formed using a single crystal silicon substrate 302. It has a 2D array of square planar aluminium electrodes 301, spaced apart by a gap 301a, arranged on the upper surface of the substrate. Each of the electrodes 301 can be addressed via circuitry 302a buried in the substrate 302. Each of the electrodes forms a respective planar mirror. An alignment layer 303 is disposed on the array of electrodes, and a liquid crystal layer 304 is disposed on the alignment layer 303. A second alignment layer 305 is disposed on the planar transparent layer 306, e.g. of glass. A single transparent electrode 307 e.g. of ITO is disposed between the transparent layer 306 and the second alignment layer 305.

Each of the square electrodes 301 defines, together with the overlying region of the transparent electrode 307 and the intervening liquid crystal material, a controllable phase-modulating element 308, often referred to as a pixel. The effective pixel area, or fill factor, is the percentage of the total pixel which is optically active, taking into account the space between pixels 301a. By control of the voltage applied to each electrode 301 with respect to the transparent electrode 307, the properties of the liquid crystal material of the respective phase modulating element may be varied, thereby to provide a variable delay to light incident thereon. The effect is to provide phase-only modulation to the wavefront, i.e. no amplitude effect occurs.

The described LCOS SLM outputs spatially modulated light in reflection. Reflective LCOS SLMs have the advantage that the signal lines, gate lines and transistors are below the mirrored surface, which results in high fill factors (typically greater than 90%) and high resolutions. Another advantage of using a reflective LCOS spatial light modulator is that the liquid crystal layer can be half the thickness than would be necessary if a transmissive device were used. This greatly improves the switching speed of the liquid crystal (a key advantage for the projection of moving video images). However, the teachings of the present disclosure may equally be implemented using a transmissive LCOS SLM.

Hologram Mapping Scheme

Figures 4A, 4B:
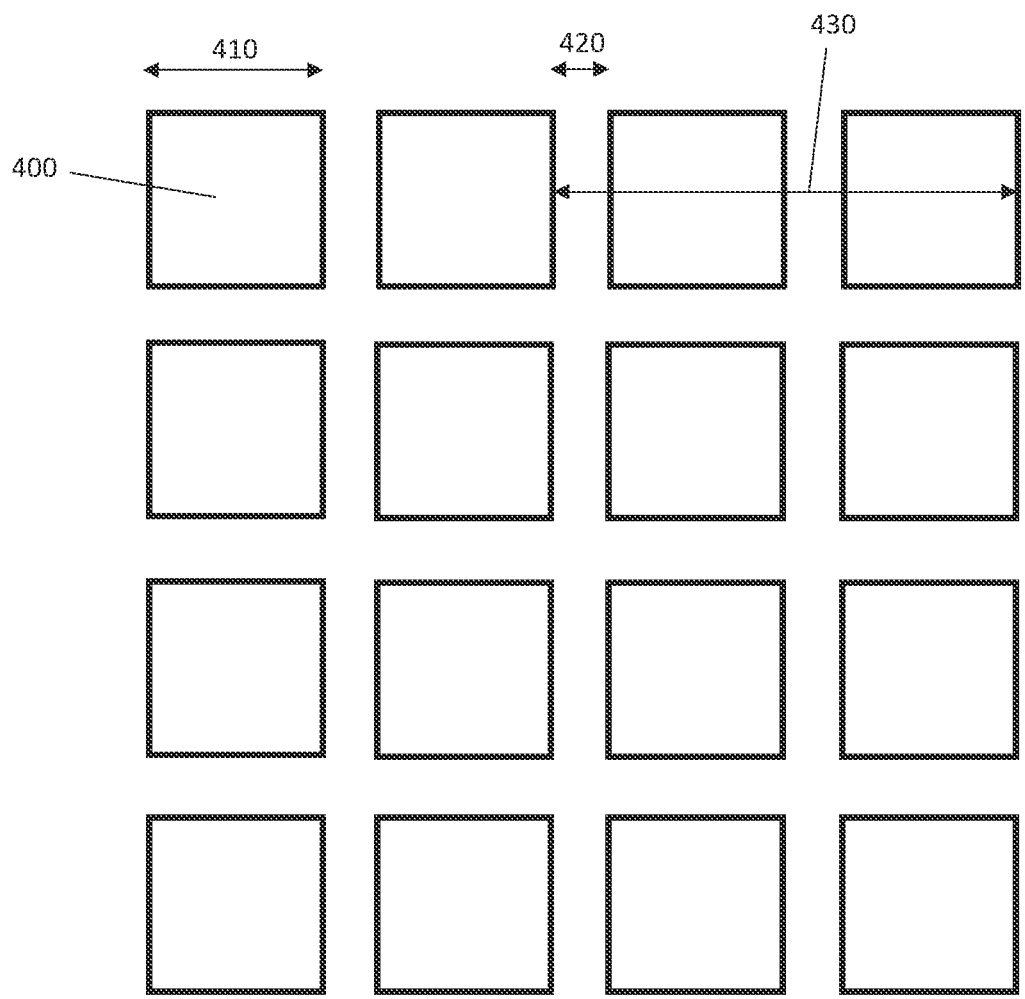
FIG. 4A shows an example hologram comprising 16 hologram pixels arranged in a [4×4] array.
FIG. 4B shows an example spatial light modulator comprising 16 light-modulating pixels arranged in a [4×4] array, wherein adjacent light-modulating pixels are spatially-separated by an inter-pixel gap.

By way of simple example only, FIG. 4A represents a hologram comprising 16 hologram pixels arranged in a regular [4×4] array comprising four rows and four columns. The two-digit numbering scheme used henceforth for each pixel comprises a row number followed by a column number. The first digit represents the row number and the second digit represents the column number. For example, "23" represents the hologram pixel value in row 2, column 3. The reader will understand that in practice each hologram may contain any number of pixels, for example, 1024 rows and 512 columns of pixels.

As will be understood from the foregoing, each hologram pixel has a hologram pixel value which may be an amplitude value, a phase value or a complex number having an amplitude value and phase value. Any reference herein to hologram pixels comprising phase-only values is by way of example only. For example, each hologram pixel value may represent a phase-delay value in the range 0 to $2\pi$ radians. For example, hologram pixel "23" may have a hologram pixel value of $\pi/2$. Light incident upon hologram pixel "23" will be retarded by $\pi/2$. Each hologram pixel is individually controlled to "display" a corresponding hologram pixel value. As a whole, the hologram applies a phase-delay distribution to an incident light wavefront.

The hologram may be displayed on a spatial light modulator. In a conventional configuration, there is a one-to-one correlation (or mapping) between hologram pixels and light-modulating pixels of the spatial light modulator. FIG. 4A is therefore equally representative of the array of [4×4] light-modulating pixels of a spatial light modulator usable to display the [4×4] hologram. For example, the hologram pixel value of hologram pixel "23" (i.e. $\pi/2$ in the previous example) may be written to light-modulating pixel "23" of a spatial light modulator comprising [4×4] light-modulating pixels. More specifically, light-modulating pixel "23" is addressed to drive the local liquid crystals such that light incident upon the area of pixel "23" of the spatial light modulator is retarded by $\pi/2$ radians. Driving the liquid crystal cell comprises applying a voltage across the liquid crystal cell which causes a tilt and/or twist of the local liquid crystals and takes advantage of the birefringence of the liquid crystal to effectively provide a voltage-controlled refractive index which delays the propagation of light through that liquid crystal cell by a software-controlled amount.

FIG. 4B shows the arrangement of light-modulating pixels, such as light-modulating pixel 400, in a spatial light modulator comprising a regular array of light-modulating pixels. Each light-modulating pixel has a pixel size 410. Adjacent light-modulating pixels are separated by a regular inter-pixel gap 420. The period 430 of the array and the wavelength of light used to illuminate the array of light-modulating pixels determine a diffraction angle, owing to the periodic of the array, and therefore the size of the holographic replay field at a distance from the spatial light modulator.

The size of the holographic replay field, I, is determined by:

$$I = 2 L \tan \theta \quad (1)$$

wherein L is the distance from the spatial light modulator to the holographic replay plane and $\theta$ is the diffraction angle, defined by:

$$\theta = \sin^{-1} \frac{\lambda}{\delta} \quad (2)$$

wherein $\delta$ is referred to herein as the "period" (see reference numeral 430 of FIG. 4B) and $\lambda$ is the wavelength of the light used to form the holographic reconstruction. The period, $\delta$, is representative of the maximum spatial frequency that can be displayed on the spatial light modulator.

The smallest feature which may be formed in the replay field may be called a "resolution element", "image spot" or an "image pixel". The Fourier transform of a quadrangular aperture is a sinc function and therefore the spatial light modulator aperture defines each image pixel as a sinc function. More specifically, the spatial intensity distribution of each image pixel on the replay field is a sinc function. Each sinc function may be considered as comprising a peak-intensity primary diffractive order and a series of decreasing-intensity higher diffractive orders extending radially away from the primary order. The size of each sinc function (i.e the physical or spatial extent of each sinc function) is determined by the size of the spatial light modulator (i.e. the physical or spatial extent of the aperture formed by the array of light-modulating elements or spatial light modulator pixels). Specifically, the larger the aperture formed by the array of light-modulating pixels, the smaller the image pixels.

Any difference between the size of the different colour holographic reconstructions significantly reduces the quality of the perceived colour reconstruction owing to (1) the general mismatch in the overall size of the different holographic reconstructions and (2) a mismatch between the positions of the image spots in each holographic reconstruction. As mentioned in the above Background, the inventor previously disclosed a technique for addressing these mismatches using different length Fourier paths for each colour channel—see, for example, British patent GB 2,547,929.

FIGS. 5 to 8 respectively show first, second, third and fourth hologram mapping schemes in accordance with some embodiments of the present disclosure. It will be appreciated that the approaches described may be extended to any number of hologram mapping schemes depending on the number of available light-modulating pixels and the maximum number of light-modulating pixels allocated to each hologram pixel. The hologram mapping schemes may be used as part of an alternative solution to the mismatch problems or, more broadly, as part of a method of dynamically, switchable or selectively changing the size of the holographic replay field. The individual light-modulating pixels described in each method and each embodiment are of the same/constant size. In some embodiments, the light-modulating pixels have a pixel size (e.g. width) less than 2000 nm, optionally, less than 1000 nm such as less than 500 nm or less than 250 nm.

Figure 5:
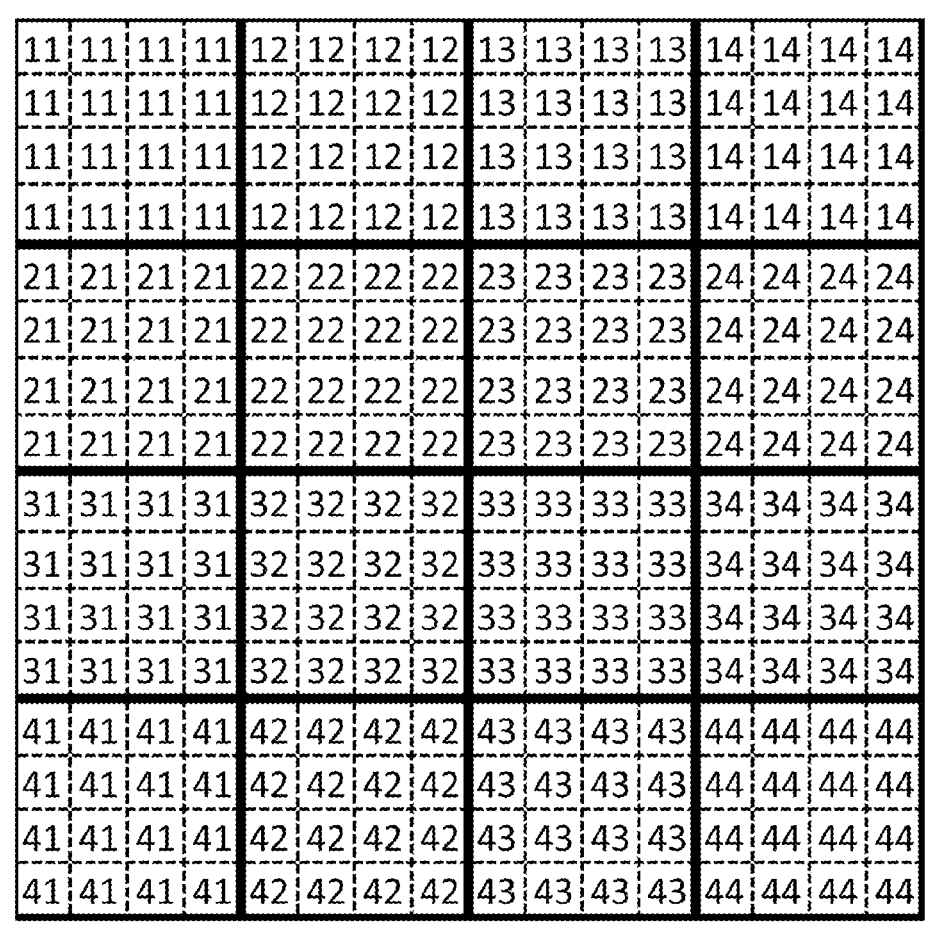

FIG. 5 shows an example of a first hologram mapping scheme in which an array of [16×16] light-modulating pixels is used to display the [4×4] hologram shown in FIG. 4A. Each hologram pixel value is displayed on 16 light-modulating pixels forming an [4×4] group or set. For example, the hologram pixel value of hologram pixel "11" is displayed in the upper-most and left-most group of [4×4] light-modulating pixels. For example, the hologram pixel value of hologram pixel "44" is displayed by all 16 light-modulating pixels of the lower-most and right-most group of [4×4] light-modulating pixels. Full use of the array of light-modulating pixels is made. That is, all available light-modulating pixels are used to display the hologram.

Figure 6:
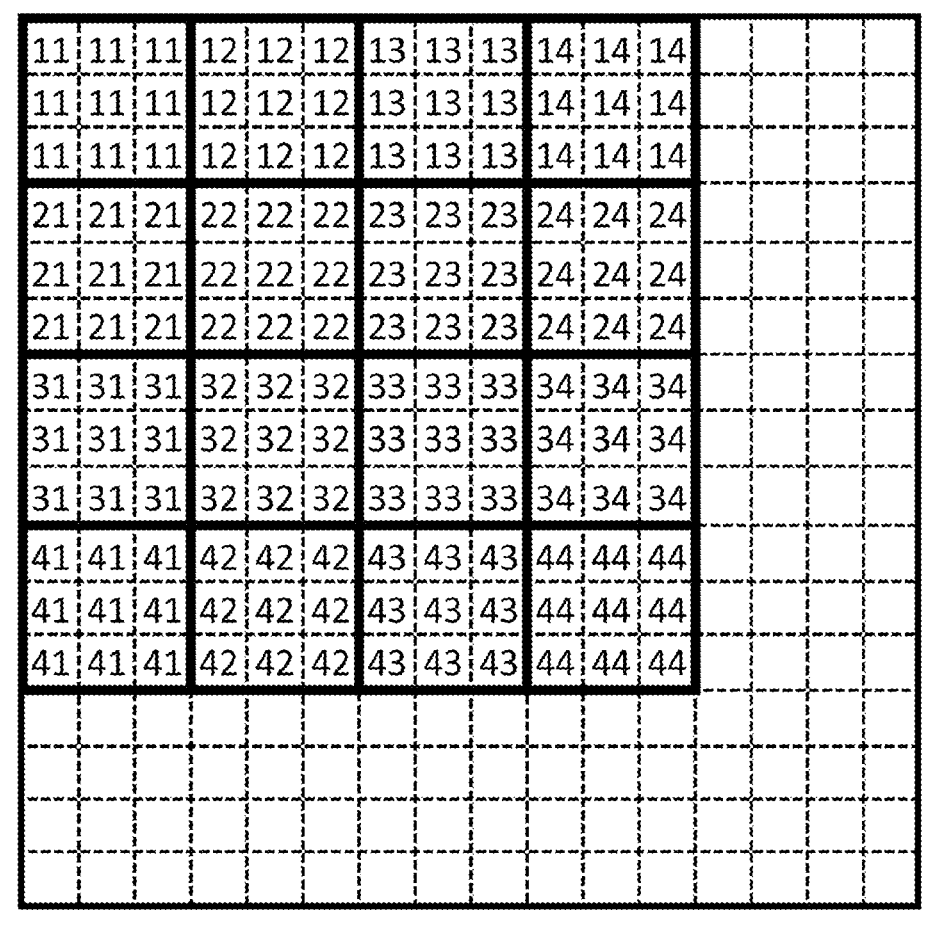

FIG. 6 shows an example of a second hologram mapping scheme which makes alternative use of the [16×16] light-modulating pixels to display the [4×4] hologram. The second hologram mapping scheme uses fewer light-modulating pixels than the first hologram mapping scheme to display each hologram pixel value. Each hologram pixel value is displayed on nine light-modulating pixels forming a [3×3] group or set. For example, the hologram pixel value of hologram pixel "11" is displayed by all nine light-modulating pixels of the upper-most and left-most group of [3×3] light-modulating pixels.

Figure 7:
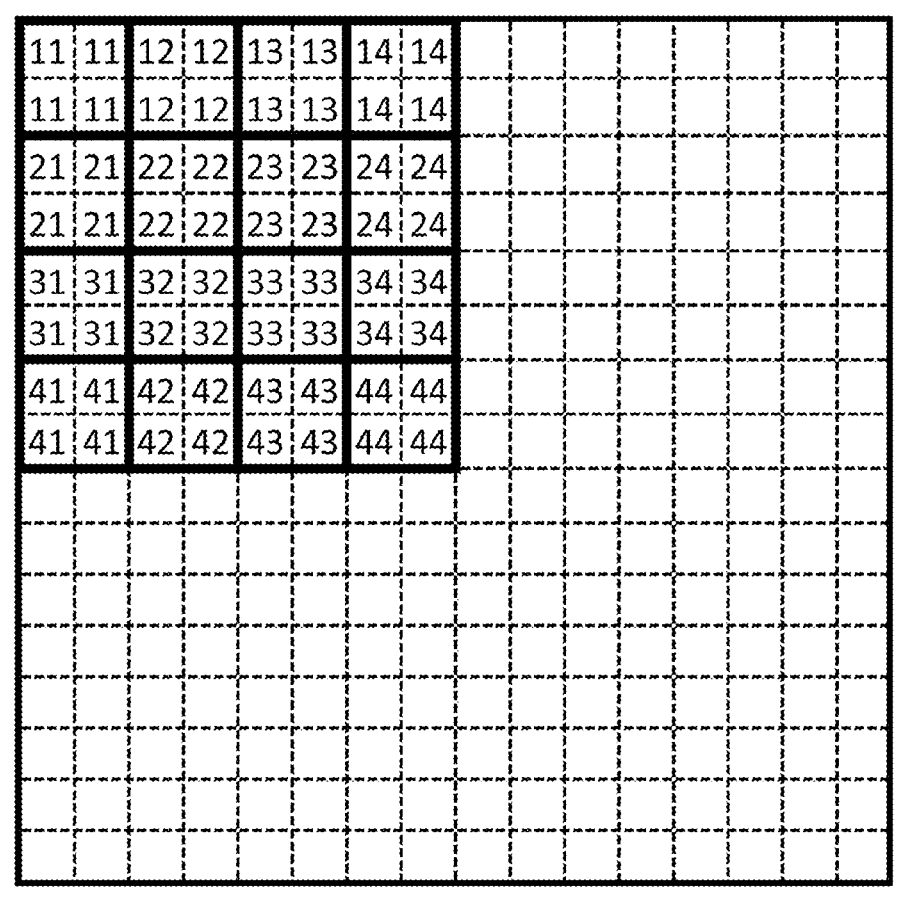

FIG. 7 shows an example of a third hologram mapping scheme which makes alternative use of the [16×16] light-modulating pixels to display the [4×4] hologram. The third hologram mapping scheme uses fewer light-modulating pixels than the second and first hologram mapping schemes to display each hologram pixel value. Each hologram pixel value is displayed on four light-modulating pixels forming a [2×2] group or set. For example, the hologram pixel value of hologram pixel "11" is displayed by all four light-modulating pixels of the upper-most and left-most group of [2×2] light-modulating pixels.

Figure 8:
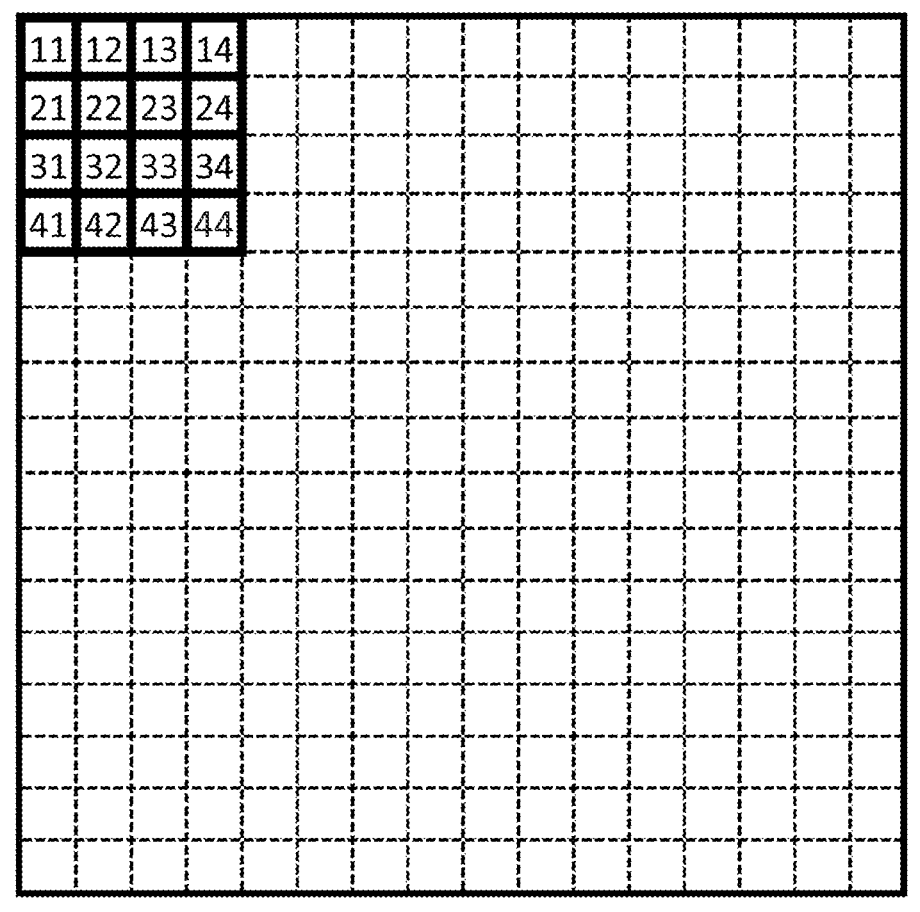

FIG. 8 shows an example fourth hologram mapping scheme which makes alternative use of the [16×16] light-modulating pixels to display the [4×4] hologram. The fourth hologram mapping scheme uses fewer light-modulating pixels than the third, second and first hologram mapping schemes to display each hologram pixel value. Each hologram pixel value is displayed on one light-modulating pixel. For example, the hologram pixel value of hologram pixel "11" is displayed by the upper-most and left-most light-modulating pixel. The fourth hologram mapping scheme is a conventional one-to-one mapping scheme.

In the first, second and third hologram mapping schemes, the hologram pixel value of each hologram pixel is displayed on or written to a plurality of light-modulating pixels. The number of light-modulating pixels is therefore greater than the number of hologram pixels. The plurality of light-modulating pixels displaying each hologram pixel value form a continuous area on the array. In other words, the plurality of light-modulating pixels displaying each hologram pixel value form a contiguous group. Each hologram pixel value is displayed on the same number of light-modulating pixels. Each contiguous group of light-modulating pixels effectively functions as a larger single light-modulating pixel. That is, a larger light-modulating area is allocated to each hologram pixel. The first, second and third hologram mapping schemes are analogous to displaying the hologram on larger pixels. Each light-modulating pixel in a contiguous group of light-modulating pixels may be termed a "sub-pixel". In some embodiments, the aspect ratio of the contiguous group of light-modulating pixels is the same as the aspect ratio of a single light-modulating pixel but, in other embodiments, the aspect ratio is different. Advantageously, a different aspect ratio may be used to provide a more preferred shape of replay field. In some embodiments, the contiguous group of light-modulating pixels form a rectangle. That is, they form a rectangular light-modulating area. For example, the contiguous group may comprise [x×y] light-modulating pixels wherein x≠y in order to provide a rectangular replay field having an aspect ratio of [y×x].

In the first, second, third and fourth hologram mapping schemes, it will be appreciated that the hologram pixels have not been rearranged or shuffled. The relative position of each light-modulating pixel or group of light-modulating pixels spatially corresponds with the relative position of the corresponding hologram pixel in the array of hologram pixels. In other words, the relative row and column positioning of each hologram pixel value is maintained during display. It may be said that the spatial arrangement or relative positional information of each hologram pixel is preserved by the hologram mapping scheme.

In the example second, third and fourth hologram mapping schemes shown, not all pixels of the spatial light modulator are used to display the hologram. It may be said that the available array of light-modulating pixels is not fully utilised. However, in other embodiments not shown in the drawings, the unused light-modulating pixels may be put to use in a tiling scheme described below in which at least part of the hologram is repeated.

The first, second and third hologram mapping schemes provide an example of displaying a hologram on a plurality of light-modulating pixels by displaying each hologram pixel value on a contiguous group of light-modulating pixels of the plurality of light-modulating pixels such that there is a one-to-many pixel correlation between the hologram pixels and the plurality of light-modulating pixels.

The use of different hologram mapping schemes including at least one hologram mapping scheme comprising one-to-many pixel correlation can be further understood in view of the following Examples in the which the size of example red, green and blue holographic reconstructions (or images) have been calculated using Equations 1 and 2.

The spatial light modulator comprises a 2D array of light-modulating elements or pixels. The images holographically projected onto the replay plane are 2D images. Reference in the following Examples to a single number of sub-pixels and distance is made with respect to the number of sub-pixels or distance in one of the two dimensions. It will be understood that the parameters described extend in two dimensions (e.g. width and height). For example, reference to a mapping scheme using n sub-pixels is used as shorthand for an area of sub-pixels comprising [n×n] subpixels. Likewise, reference herein to an image size of y mm is used as shorthand for a 2D image having a size of [y×y] mm.

Example 1

Table 1 below shows how the size of the red (630 nm), green (532 nm) and blue (450 nm) holographic reconstructions depends on the number of sub-pixels used to display each corresponding hologram pixel.

TABLE 1

| No. of sub-pixels | Total size / nm | Inter-pixel gap / nm | Red image / mm | Green image / mm | Blue image / mm |
| --- | --- | --- | --- | --- | --- |
| 1 | 750 | 125 | 77.174 | 63.820 | 53.218 |
| 2 | 1500 | 125 | 39.519 | 33.186 | 27.962 |
| 3 | 2250 | 125 | 26.763 | 22.542 | 19.033 |
| 4 | 3000 | 125 | 20.263 | 17.086 | 14.437 |

Column 1 of Table 1 represents the number of light-modulating pixels (or sub-pixels) per group. In this example, each light-modulating pixel has a pixel size of 750 nm and the distance from the spatial light modulator to the replay plane, L, is 100 mm. The total size of a group is therefore the multiple of the number of sub-pixels per group and the pixel size. The total size represents the size of each light-modulating area assigned to each hologram pixel value and determines the diffraction angle. The fourth, fifth and sixth columns of Table 1 show the calculated image size when the displayed hologram is illuminated with red, green and blue light, respectively.

If four sub-pixels (more specifically, [4×4] sub-pixels) are used for the red, green and blue holographic reconstructions (i.e. images), the size mismatch between the largest image (red) and smallest image (blue) is 6.074 mm (in width and in height). However, if only three sub-pixels (i.e. [3×3]) are used for the blue image, the size mismatch is reduced to 3.313 mm because the blue image is increased in size by 1.947 mm to 19.033 mm (in each direction) and the green image is now the smallest image. A corresponding improvement in the mismatch between the positions of the image spots will also be achieved because the number of image spots is not affected by the hologram mapping scheme. An increase in image size, for example, provides an increase in the spacing between adjacent image spots (that is, a decrease in the density of image spots). Accordingly, an improved composite colour image is achieved because the mismatches between the colour images are reduced. This method may be used to reduce the mismatches to an acceptable level or used to reduce the demands on other methods used in conjunction to reduce the mismatches to an acceptable level. There is therefore provided a method comprising using a first number of light-modulating pixels to display each hologram pixel value of a first hologram and a second number of light-modulating pixels to display each hologram pixel value of a second hologram.

In the example of Table 1, a one-to-many pixel correlation is used for the red, green and blue images. However, it will be understood that in other examples, a first hologram may be mapped to light-modulating pixels using a one-to-many pixel correlation (e.g. FIG. 5, 6 or 7) and a second hologram may be mapped to the light-modulating pixels using a one-to-one pixel correlation (e.g. FIG. 8) in order to reduce a mismatch between the corresponding first and second images. Accordingly, the method may include (i) displaying a first hologram on a plurality of light-modulating pixels by displaying each hologram pixel value on a contiguous group of light-modulating pixels of the plurality of light-modulating pixels such that there is a one-to-many pixel correlation between the hologram and the plurality of light-modulating pixels and (ii) displaying a second hologram on a plurality of light-modulating pixels by displaying each second hologram pixel value on a corresponding light-modulating pixel such that there is a one-to-one correlation between the second hologram and the plurality of light-modulating pixels.

Example 2

In a second example, each light-modulating pixel has a pixel size of 1000 nm, the inter-pixel gap is 50 nm and the distance from the spatial light modulator to the replay plane, L, is 300 mm.

TABLE 2

| No. of sub-pixels | Total size / nm | Inter-pixel gap / nm | Red image / mm | Green image / mm | Blue image / mm |
|---|---|---|---|---|---|
| 4 | 4000 | 50 | 46.808 | 39.493 | 33.385 |
| 5 | 5000 | 50 | 37.499 | 31.648 | 26.759 |
| 6 | 6000 | 50 | 31.282 | 26.406 | 22.329 |

It can be seen from Table 2 that if four sub-pixels are used for each of the red, green and blue holograms, the size mismatch (difference in size between the largest image and the smallest image at the replay plane) is 13.423 mm. However, if a different number of light-modulating pixels are used for each colour, the size mismatch can be reduced. In this example, if six sub-pixels are used for red, five sub-pixels are used for green and four sub-pixels are used for blue, the size mismatch (difference in size between the blue image and red image) is reduced to 33.385−31.282 mm=2.103 which is more than a factor of six improvement.

In embodiments, the number of sub-pixels used to display each hologram pixel increases with wavelength in order to decrease a size mismatch at the holographic replay plane. In embodiments, the number of sub-pixels used to display each hologram pixel value of a red hologram is greater than the number of sub-pixels used to display each hologram pixel value of a green hologram and, optionally, the number of sub-pixels used to display each hologram pixel value of the green hologram is greater than the number of sub-pixels used to display each hologram pixel value of a blue hologram.

Figure 9A:
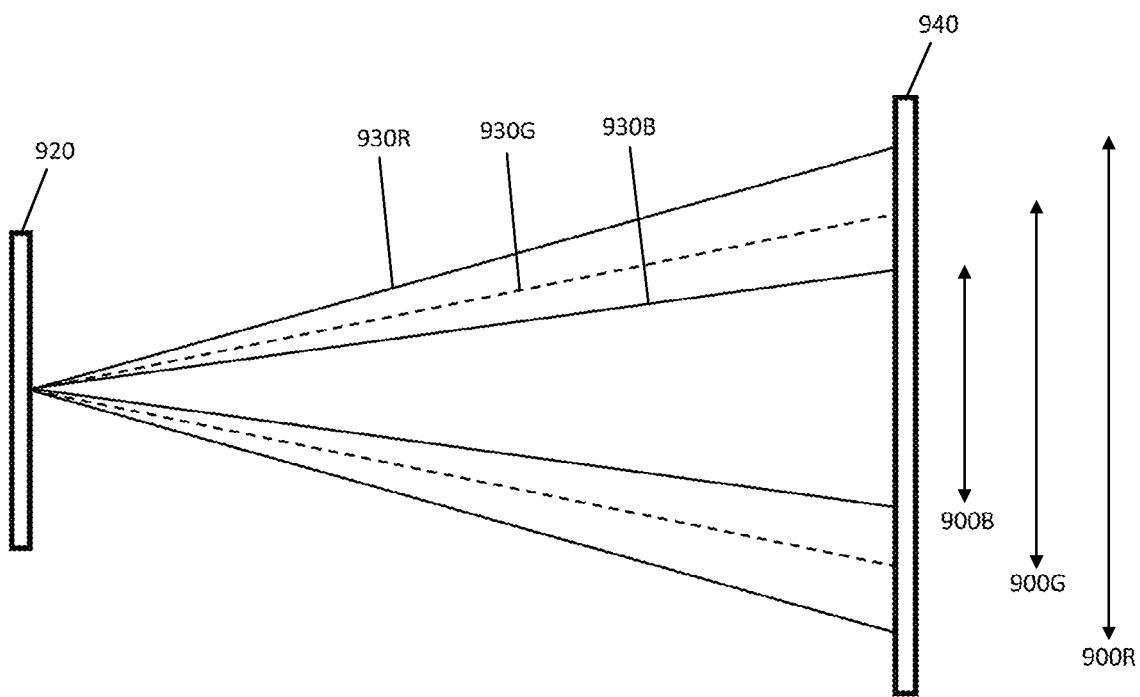
FIG. 9A shows a spatial light modulator arranged to display holograms in a FSC scheme.
Figure 9B:
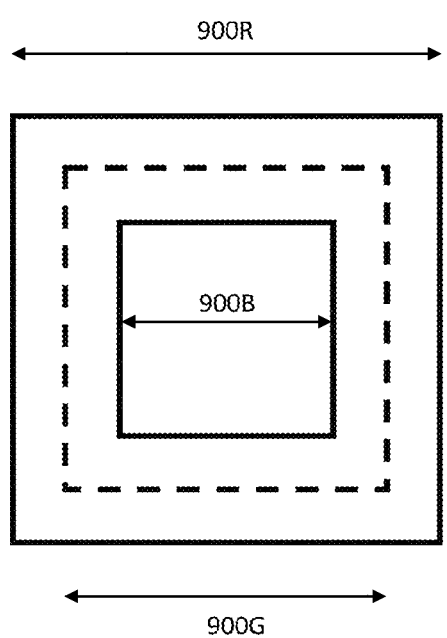
FIG. 9B shows a colour overlap area, corresponding to the blue replay field 900B, when red, green and blue light is diffracted from respective holograms displayed in turn on a spatial light modulator in a frame sequential colour scheme.

The use of sub-pixel groups in accordance with the present disclosure also makes better use of the number of holographically-formed image pixels in a multi-wavelength projector as can be understood with reference to FIGS. 9A and 9B. Specifically, FIG. 9A shows a spatial light modulator 920 arranged to display holograms in a FSC scheme. A red replay field 900R is formed at a replay plane 940 using red light 930R diffracted by a corresponding hologram displayed on the spatial light modulator 920. A green replay field 900G is formed at the replay plane 940 in the same way using green light 930G. A blue replay field 900B is formed at the replay plane 940 using blue light 930B. In accordance with Equations 1 and 2, the red replay field 900R is bigger than the green replay field 900G which is, in turn, bigger than the blue replay field 900B. This is further illustrated in FIG. 9B.

As will be understood from the foregoing, a red image is holographically reconstructed within the red replay field 900R, a green image is holographically reconstructed within the green replay field 900G and a blue image is holographically reconstructed within the blue replay field 900B.

A composite colour image in which each pixel may comprise red, green and blue light may only be displayed using the overlap area at the replay plane. That is, the area where red, green and blue image content may be displayed. The area of overlap is, of course, the area of the smallest replay field, namely the blue replay field 900B. If the overlap area is used to display full colour images in a FSC scheme, the red and green images will comprise fewer pixels than the blue image because some red and green pixels will be outside the area of overlap.

Table 3 below illustrates an example in which the blue image comprises 1024×1024 image pixels. Specifically, Table 3 shows how the concept of using a first number of light-modulating pixels to display each hologram pixel value of a first hologram and a second number of light-modulating pixels to display each hologram pixel value of a second hologram can be used to better optimise the number of image pixels and therefore quality of the image. It can be seen how using a different number of sub-pixels for red, green and blue means that more red and green pixels are formed in the overlap area.

TABLE 3

| Number of sub-pixels used (in each dimension) | Red overlap / pixels | Green overlap / pixels | Blue overlap / pixels |
|---|---|---|---|
| Red = 4, Green = 4 and blue = 4 | 730 × 730 | 865 × 865 | 1024 × 1024 |
| Red = 6, Green = 5 and blue = 4 | 959 × 959 | 970 × 970 | 1024 × 1024 |

It can be seen from Table 3 that by using an increased number of sub-pixels to display each hologram pixel for red and green, the number of red and green image pixels, respectively, in the overlap area is increased. Specifically, the number of red pixels in the overlap area is increased by 959−730 pixels=292 pixels and the number of green pixels in the overlap area is increased by 970−865 pixels=105 pixels. This equates to a 40% increase in the number of red image pixels in the overlap area and a 12% increase in the number of green image pixels in the overlap area.

The number of sub-pixels used to display each hologram pixel value determines the total number of light-modulating pixels required to display the hologram. The total number of light-modulating pixels required to display a hologram defines a light-modulating area on the spatial light modulator. Each computer-generated hologram (red, green or blue) may comprise, for example, 1024×1024 hologram pixel values. If six light-modulating pixels having a pixel pitch (pixel size plus inter-pixel gap) of 1 µm are used to display each red hologram pixel value (i.e. six-by-six sub-pixels are used per red hologram pixel), the light-modulating area required to display the red hologram would be 6×1000× 1024=6.1 mm in width and in height. If four light-modulating pixels having a size of 1 µm are used to display each blue hologram pixel value, the light-modulating area required to display the blue hologram would be 4.1×4.1 mm. Therefore, in some embodiments such as Example 2, the red light-modulating area (that is, the light-modulating area used to display the red hologram) is larger in size (e.g. width and/or area) than the green light-modulating area which is, in turn, larger than the blue light-modulating area.

In some embodiments, the diameter of the light spot which illuminates the spatial light modulator is determined based on the physical size (e.g. width in millimetres and/or area in millimetres squared) of the light-modulating area used to display the corresponding hologram. In some embodiments, one dimension of the light spot is substantially matched to one dimension of the corresponding hologram. For example, the diameter of the light spot may be matched to the width of the light-modulating area used to display the corresponding hologram.

In some embodiments, the shape of the light-modulating area is substantially the same as the shape of the light spot from the light system in which embodiments, the size of the light spot may be substantially equal to the size of the light-modulating area. In other embodiments, the light-modulating area and light spot may have different shapes, but they may still be matched. Matching comprises ensuring that each light-modulating pixel within the light-modulation area receives sufficient light for good quality holographic reconstruction without wasting too much light energy by illuminating outside the light-modulating area. In some embodiments, the light modulating area is quadrilateral (e.g. square or rectangular) and the light spot output by each light system is elliptical or circular. The size of the light spot may be such that the light-modulating area is slightly overfilled. That is, the area illuminated is slightly larger than the area of the light-modulating area. The size of the light spot may be such that the area outside of the light-modulating area which receives light is minimised. The size of the light spot may be such that the amount of light energy wasted is minimised. The intensity of the light spot may be non-uniform in cross-section. For example, the spatial intensity of the light spot may be Gaussian. The size of the light spot may be chosen such that the intensity of the light spot illuminating the light-modulating area is at least $1/e^2$ of the maximum intensity at all points within the light-modulating area. Alternatively, the size of the light spot may be chosen such that the intensity of the light spot is $1/e^2$ of the maximum at selected points on the light-modulating area such as at the four corners of the light-modulating area or the four mid-points of the four respective sides delimiting the light-modulating area. In some embodiments, the diameter of the light spot increases with the size of the light-modulating area.

Figure 10A:
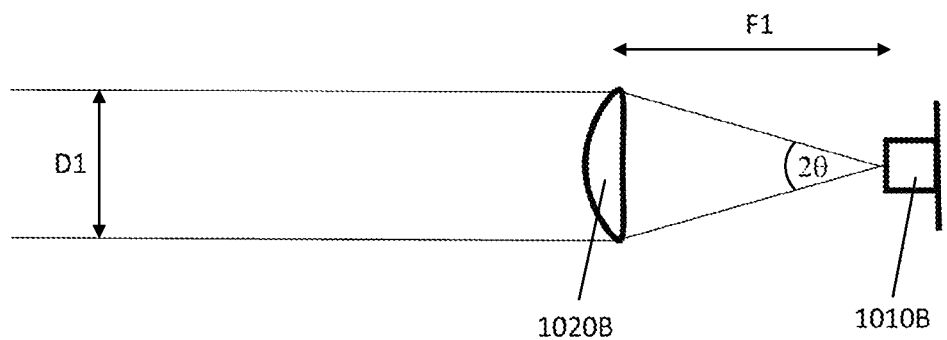
FIGS. 10A, 10B and 10C show blue, green and red light engines used to illuminated blue, green and red holograms formed using four, five and six light-modulating pixels per hologram pixel, respectively.
Figure 10B:
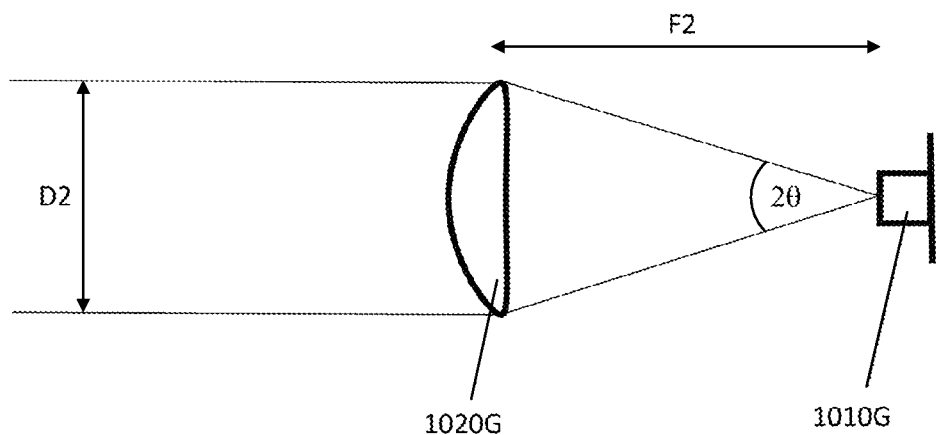
Figure 10C:
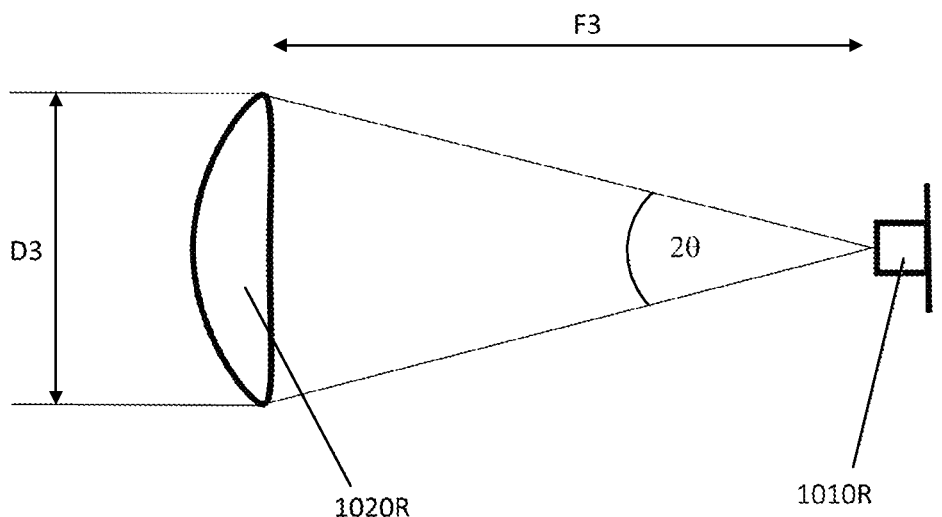

FIGS. 10A, 10B and 10C illustrate an embodiment in which the diameter of the light spot which illuminates the spatial light modulator is dependent on, or a function of, the wavelength of the illuminating light. FIG. 10A shows a first light system arranged to output blue light suitable for illuminate a blue hologram comprising four sub-pixels (more specifically, [4×4]) per hologram pixel. In more detail, FIG. 10A shows a blue laser diode 1010B emitting diverging blue light having a half-angle, θ. A lens 1020B is positioned at its focal length, F1, from the blue laser diode 1010B such that collimated blue light having a beam diameter, D1, is formed downstream lens 1020B. FIG. 10B shows a second light system arranged to output green light suitable for illuminate a green hologram comprising five sub-pixels per hologram pixel. More specifically, FIG. 10B shows a green laser diode 1010G emitting diverging green light having the half-angle, θ. A lens 1020G is positioned at its focal length, F2, from the green laser diode 1010G such that collimated green light having a beam diameter, D2, is formed downstream lens 1020G. FIG. 10C shows a third light system arranged to output red light suitable for illuminate a red hologram comprising six sub-pixels per hologram pixel. More specifically, FIG. 10C shows a red laser diode 1010R emitting diverging red light having the half-angle, θ. A lens 1020R is positioned at its focal length, F3, from the red laser diode 1010R such that collimated red light having a beam diameter, D3, is formed downstream lens 1020R. The angle of divergence of the blue light emitted by the blue laser diode 1010B is the same as that of the green light emitted by the green laser diode 1010G which is, in turn, the same as that of the red light emitted by the red laser diode 1010R. In other words, the half-angle, θ, in the blue light system (FIG. 10A) is the same as that in the green light system (FIG. 10B) which is, in turn, the same as that in the red lighting system (FIG. 10C). It may be said that, in this embodiment, the numerical aperture of the blue lighting system is substantially equal to that of the green lighting system which is, in turn, substantially equal to that of the red lighting system. Although FIG. 10 show the collimating lens being fully illuminated (that is, illuminated over its full diameter), the present disclosure is equally applicable to underfilling the collimating lens in which case it may be said that the operating numerical aperture of the three lighting systems is the same. In some embodiments, the diameter D3 of the red light spot used to illuminate the red hologram is greater than the diameter D2 of the green light spot used to illuminate the green hologram which is, in turn, greater than the diameter D1 of the blue light spot used to illuminate the blue hologram.

If the size of the light-modulating area is reduced, the required beam diameter, D, from the corresponding lighting system is reduced. In turn, the required focal length, F, of the collimating lens of the corresponding lighting system is reduced. Therefore, if fewer sub-pixels are used to display the green and blue holograms than are used to display the red hologram, the size of the green lighting system and the size of the blue lighting systems may be less than the size of the red lighting system. Accordingly, the physical volume of space required by the green and blue light systems may be reduced (compared to the red lighting system) and a more compact projector may be provided.

Additional Features

In the embodiments of FIGS. 5 to 8, a [4×4] hologram is displayed on the same spatial light modulator using four different hologram addressing schemes. In some embodiments, this is implemented in a FSC scheme. In a first frame, the first hologram may be mapped on a spatial light modulator using a first hologram addressing scheme and, in a second frame, the second hologram may be mapped onto the same spatial light modulator using a second hologram addressing scheme. The first frame and second frame may be displayed at different times. The first and second frame may be sequential frames of a sequence of frames such as a video rate sequence of frames.

In the example above with reference to Table 1, the hologram addressing scheme of FIG. 5 is used for displaying the red and green holograms, and the hologram addressing scheme of FIG. 6 is used for displaying the blue hologram. Again, in some embodiments, this is implemented in a FSC scheme. In this case, at least one light-modulating pixel is used to display a hologram pixel value of the first hologram at a first time and a hologram pixel value of the second hologram at a second time different to the first time.

Alternatively, the different first and second addressing schemes may be used in a SSC scheme. In such embodiments, the first hologram is displayed on a first spatial light modulator and the second hologram is displayed on a second spatial light modulator. This may be preferred when three separate colour channels are used such as disclosed in British patent GB 2,547,929 incorporated herein by reference. In other words, the method disclosed herein may be used in conjunction with the method of GB 2,547,929 to reduce the mismatches.

In some embodiments, the method further comprises illuminating the displayed hologram with light having a wavelength to project a holographic replay field having an area and illuminating the second displayed hologram with light having a second wavelength to project a second holographic replay field having a second area. It can be understood that the different number of light-modulating pixels used to display the hologram and the second hologram may be such that the area and second area are substantially the same size. The area and the second area may be overlapped to form a composite colour replay field having reduced mismatches between the different colour components.

In other embodiments, the method further comprises illuminating the displayed hologram with light having a wavelength to project a holographic replay field having an area and illuminating the second displayed hologram with light having the wavelength to project a second holographic replay field having a second area. It can be understood that the different number of light-modulating pixels used to display the hologram and the second hologram may be such that the size of the holographic reconstruction is dynamically-changed. There is therefore provided a method of changing the image size comprising changing the number of sub-pixels.

Embodiments refer to an electrically-activated LCOS spatial light modulator by way of example only. The teachings of the present disclosure may equally be implemented on any spatial light modulator capable of displaying a computer-generated hologram in accordance with the present disclosure such as any electrically-activated SLMs, optically-activated SLM, digital micromirror device or microelectromechanical device, for example.

In some embodiments, each illumination is provided by a light source such as a laser for example a laser diode. In some embodiments, the holographic reconstructions or images are formed on a light receiving surface such as a diffuser surface or screen for example a diffuser.

The quality of the holographic reconstruction may be affect by the so-called zero order problem which is a consequence of the diffractive nature of using a pixelated spatial light modulator. Such zero-order light can be regarded as "noise" and includes for example specularly reflected light, and other unwanted light from the SLM. In the example of Fourier holography, this "noise" is focussed at the focal point of the Fourier lens leading to a bright spot at the centre of the holographic reconstruction. The zero order light may be simply blocked out however this would mean replacing the bright spot with a dark spot. Some embodiments include an angularly selective filter to remove only the collimated rays of the zero order. Embodiments also include the method of managing the zero-order described in European patent 2,030,072, which is hereby incorporated in its entirety by reference.

In embodiment of FIG. 5, the hologram fills the spatial light modulator. That is, the hologram uses all the pixels of the spatial light modulator. In other embodiments (e.g. FIGS. 6, 7 and 8), the size of the hologram is less than the size of the spatial light modulator. In some of these other embodiments, part of the hologram (that is, a contiguous subset of the pixels of the hologram) is repeated in the unused pixels. This technique may be referred to as "tiling" wherein the surface area of the spatial light modulator is divided up into a number of "tiles", each of which represents at least a subset of the hologram. Each tile is therefore of a smaller size than the spatial light modulator. In some embodiments, the technique of "tiling" is implemented to increase image quality. Specifically, some embodiments implement the technique of tiling to minimise the size of the image pixels whilst maximising the amount of signal content going into the holographic reconstruction. In some embodiments, the holographic pattern written to the spatial light modulator comprises at least one whole tile (that is, the complete hologram) and at least one fraction of a tile (that is, a continuous subset of pixels of the hologram).

In some embodiments, only the primary replay field is allowed to propagate to the replay plane and system comprises physical blocks, such as baffles, arranged to restrict the propagation of the higher order replay fields through the system.

Examples describe illuminating the SLM with visible light but the skilled person will understand that the light sources and SLM may equally be used to direct infrared or ultraviolet light, for example, as disclosed herein. For example, the skilled person will be aware of techniques for converting infrared and ultraviolet light into visible light for the purpose of providing the information to a user. For example, the present disclosure extends to using phosphors and/or quantum dot technology for this purpose.

Some embodiments describe 2D holographic reconstructions by way of example only. In other embodiments, the holographic reconstruction is a 3D holographic reconstruction. That is, in some embodiments, each computer-generated hologram forms a 3D holographic reconstruction.

The holographic projector in accordance with the present disclosure may be used as the picture generating unit of a head-up display or head-mounted display such as a near-eye device. That is, there is provided a head-up display, head-mounted display and near-eye device including the holographic projector in accordance with the present disclosure. In some embodiments, there is provided a vehicle comprising head-up display having a picture generating unit including the holographic projector. The vehicle may be an automotive vehicle such as a car, truck, van, lorry, motorcycle, train, airplane, boat, or ship.

The methods and processes described herein may be embodied on a computer-readable medium. The term "computer-readable medium" includes a medium arranged to store data temporarily or permanently such as random-access memory (RAM), read-only memory (ROM), buffer memory, flash memory, and cache memory. The term "computer-readable medium" shall also be taken to include any medium, or combination of multiple media, that is capable of storing instructions for execution by a machine such that the instructions, when executed by one or more processors, cause the machine to perform any one or more of the methodologies described herein, in whole or in part.

The term "computer-readable medium" also encompasses cloud-based storage systems. The term "computer-readable medium" includes, but is not limited to, one or more tangible and non-transitory data repositories (e.g., data volumes) in the example form of a solid-state memory chip, an optical disc, a magnetic disc, or any suitable combination thereof. In some example embodiments, the instructions for execution may be communicated by a carrier medium. Examples of such a carrier medium include a transient medium (e.g., a propagating signal that communicates instructions).

It will be apparent to those skilled in the art that various modifications and variations can be made without departing from the scope of the appended claims. The present disclosure covers all modifications and variations within the scope of the appended claims and their equivalents.

What is claimed is:

1. A display device comprising:
   a plurality of light-modulating pixels, each light-modulating pixel being configured to modulate phase of light received thereby at a plurality of modulation levels; and
   a controller arranged to:
      receive data relating to a first hologram comprising a first plurality of hologram pixels each having a respective hologram pixel value and to selectively-drive a first subset of light-modulating pixels of the first subset of light-modulating pixels so as to display the first hologram on the first subset of light-modulating pixels such that there is a 1:x pixel correlation between the first hologram and the first subset of light-modulating pixels, wherein x is an integer; and
      receive data relating to a second hologram comprising a second plurality of hologram pixels each having a respective hologram pixel value; and to selectively-drive a second subset of light-modulating pixels of the second subset of light-modulating pixels so as to display the second hologram on the second subset of light-modulating pixels such that there is a 1:y pixel correlation between the second hologram and the second subset of light-modulating pixels, wherein y is an integer;
   wherein the first subset of light-modulating pixels displaying the first hologram projects a first image area having a first area when illuminated with light having a first wavelength; and
   wherein the second subset of light-modulating pixels displaying the second hologram projects a second image area having a second area when illuminated with light having a second wavelength,
   wherein x #y, such that the first area and second area are substantially the same size.

2. The display device as claimed in claim 1, wherein each light-modulating pixel is less than 500 nm in width.

3. The display device as claimed in claim 1, wherein each light-modulating pixel is less than 250 nm in width.

4. The display device as claimed in claim 1, wherein each light-modulating pixel is configured to modulate amplitude of light received thereby.

5. The display device as claimed in claim 1, wherein each light-modulating pixel is a cell containing liquid crystal.

6. The display device as claimed in claim 1, wherein each of the first subset of light-modulating pixels and the second subset of light-modulating pixels are arranged in a 2D array.

7. The display device as claimed in claim 1, wherein each of the plurality of light-modulating pixels is a reflective light-modulating pixel.

8. The display device as claimed in claim 1, wherein the controller is arranged to display the first hologram by displaying each hologram pixel value of the first hologram on a contiguous group of light-modulating pixels of the first subset of light-modulating pixels such that there is a one-to-many pixel correlation between the first hologram and the first subset of light-modulating pixels.

9. The display device as claimed in claim 1, wherein the first subset of light-modulating pixels is provided on a first spatial light modulator and the second subset of light-modulating pixels is provided on a second spatial light modulator, wherein the controller is arranged to such that the first hologram is displayed on the first spatial light modulator and the second hologram is displayed on the second spatial light modulator.

10. The display device as claimed in claim 1, further comprising a hologram engine arranged to provide the data relating to the first hologram comprising the plurality of hologram pixels each having the respective hologram pixel value.

11. The display device as claimed in claim 1, wherein the number of pixels of the first subset of light-modulating pixels is greater than the number of pixels of the second subset of light-modulating pixels.

12. A method of displaying holograms, the method comprising:
   providing a plurality of light-modulating pixels, each light-modulating pixel being configured to modulate phase of light received thereby at a plurality of modulation levels, the plurality of light-modulating pixels comprising a first subset of light modulating pixels and a second subset of light-modulating pixels;
   receiving data relating to a first hologram comprising a first plurality of hologram pixels each having the respective hologram pixel value;
   displaying the first hologram on the first subset of light-modulating pixels such that there is a 1:x pixel correlation between the first hologram and the first subset of light-modulating pixels pixels, wherein x is an integer;
   receiving data relating to a second hologram comprising a second plurality of hologram pixels each having a respective hologram pixel value;
   displaying the second hologram on the second subset of light-modulating pixels such that there is a 1:y pixel correlation between the second hologram and the second subset of light-modulating pixels, wherein y is an integer;
   illuminating the first subset of light-modulating pixels displaying the first hologram with light having a first wavelength so as to project a first image area having a first area; and illuminating the second subset of light-modulating pixels displaying the second hologram with light having a second wavelength so as to project a second image area having a second area, wherein x #y, such that the first area and second area are substantially the same size.

13. The method as claimed in claim 12, wherein the first hologram is displayed on the first subset of light-modulating pixels by displaying each hologram pixel value on a contiguous group of light-modulating pixels of the first subset of light-modulating pixels, such that there is a one-to-many pixel correlation between each hologram pixel and the number of light-modulating pixels within the contiguous group, which display its pixel value.

14. The method as claimed in claim 13, wherein each hologram pixel value within the first hologram is displayed on the same number of light-modulating pixels of the first subset of light-modulating pixels as each of the respective others.

15. The method as claimed in claim 12, wherein each light-modulating pixel is less than 500 nm in width.

16. The method as claimed in claim 12, wherein each light-modulating pixel is less than 250 nm in width.

17. The method as claimed in claim 12, wherein each of the first subset of light-modulating pixels and the second subset of light-modulating pixels are arranged in a 2D array.

18. The method as claimed in claim 12, wherein each of the plurality of light-modulating pixels is a reflective light-modulating pixel.

19. The method as claimed in claim 12, wherein the number of pixels of the first subset of light-modulating pixels is greater than the number of pixels of the second subset of light-modulating pixels.

* * * * *